(12) United States Patent
Akahira et al.

(10) Patent No.: US 6,394,578 B1
(45) Date of Patent: May 28, 2002

(54) PRODUCTION PROCESS OF COLOR FILTER, LIQUID CRYSTAL DISPLAY DEVICE USING THE COLOR FILTER PRODUCED BY THE PRODUCTION PROCESS, AND INK-JET HEAD

(75) Inventors: Makoto Akahira, Kawasaki; Satoshi Wada, Machida; Hiromitsu Yamaguchi, Kawasaki; Takuhiro Ohgushi, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,218

(22) Filed: Aug. 31, 1999

(30) Foreign Application Priority Data

Sep. 2, 1998 (JP) ............................ 10-247919

(51) Int. Cl.[7] .................................. B41J 2/21
(52) U.S. Cl. ....................................... 347/43
(58) Field of Search ............................. 347/43, 40, 12, 347/16

(56) References Cited

U.S. PATENT DOCUMENTS 4,272,771 A  6/1981  Furukawa .................... 347/43
5,132,702 A  * 7/1992  Shiozaki et al. ............... 347/12

FOREIGN PATENT DOCUMENTS

| EP | 517 521   | 12/1992 |
| EP | 517 543   | 12/1992 |
| EP | 660 159   | 6/1995  |
| EP | 675 385   | 10/1995 |
| EP | 790 509   | 8/1997  |
| EP | 832 752   | 4/1998  |
| JP | 59-75205  | 4/1984  |
| JP | 9-138306  | 5/1987  |
| JP | 63-235901 | 9/1988  |
| JP | 1-217302  | 8/1989  |
| JP | 4-123005  | 4/1992  |
| JP | 8-292310  | 11/1996 |
| JP | 10-14217  | 5/1998  |

* cited by examiner

Primary Examiner—Thinh Nguyen
(74) Attorney, Agent, or Firm—Fitzpatrick, Cella, Harper & Scinto

(57) ABSTRACT

Disclosed herein is a process for producing a color filter, comprising the step of dividing a coloring region on a substrate into plural scanning regions and successively coloring the respective scanning regions by an ink-jet system, wherein the scanning regions have a portion overlapped each other.

8 Claims, 19 Drawing Sheets

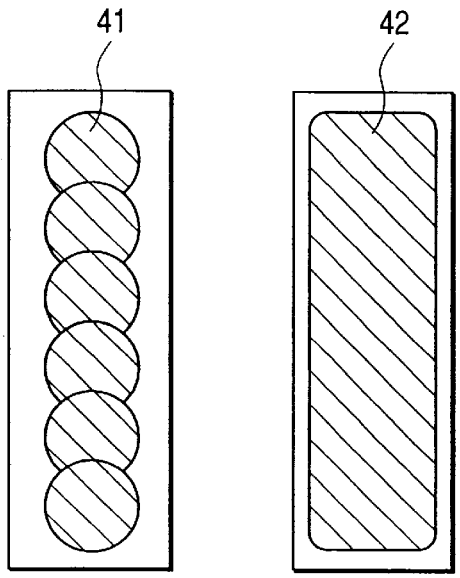
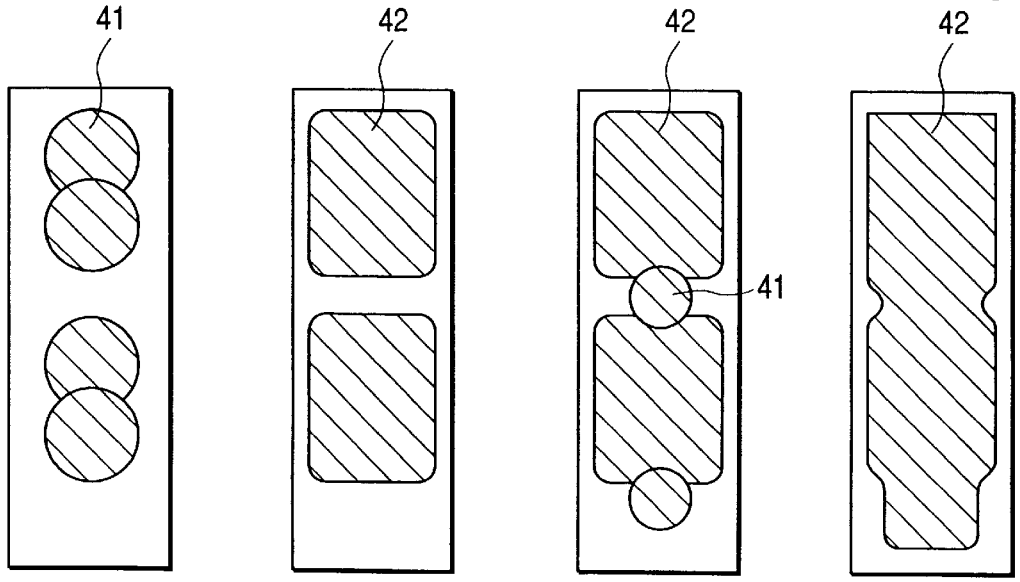

PRODUCTION PROCESS OF COLOR FILTER, LIQUID CRYSTAL DISPLAY DEVICE USING THE COLOR FILTER PRODUCED BY THE PRODUCTION PROCESS, AND INK-JET HEAD

BACKGROUND OF THE INVENTION

1. Field of the Invention

The present invention relates to a production process of a color filter, comprising applying inks by an ink-jet system to form colored portions, a liquid crystal display device using the color filter produced by the production process, and an ink-jet head.

2. Related Background Art

With the advancement of personal computers, particularly, portable personal computers in recent years, the demand for liquid crystal display devices, particularly, color liquid crystal display devices tends to increase. It is however necessary to reduce the cost of the color liquid crystal display devices for further spreading them. There is an increasing demand for reduction in the cost of color filters particularly given much weight from the viewpoint of the cost.

Various methods have heretofore been attempted for meeting the above demand while satisfying properties required of the color filters. However, no method satisfying all the required properties is yet established. The individual methods will hereinafter be described.

The first method oftenest used is a dyeing process. In the dyeing process, a layer of a water-soluble polymeric material, which is a material to be dyed, is first formed on a glass substrate, and the layer thus formed is patterned in the desired form by a photolithographic step. Thereafter, the substrate on which the coating film has been patterned is immersed in a dye bath to obtain a colored pattern. These steps are repeatedly performed three times to produce a color filter layer composed of colored patterns of red (R), green (G) and blue (B).

The second method is a pigment dispersing process which has been replacing the dyeing process in recent years. In this process, a layer of a photosensitive resin in which a pigment has been dispersed is first formed on a substrate and then subjected to patterning, thereby obtaining a pattern of a single color. These steps are repeatedly performed three times, thereby producing a color filter layer composed of colored patterns of R, G and B.

As the third method, there is an electrodeposition process. In this process, a transparent electrode is first patterned on a substrate. The substrate is then immersed in an electrodeposition coating fluid containing a pigment, a resin, an electrolytic solution and the like to electrically deposit the first color. These steps are repeatedly performed three times, thereby forming a color filter layer composed of colored patterns of R, G and B. Finally, this color filter layer is baked to produce a color filter.

The fourth method is a process which comprises the steps of applying three times separately resin dispersions of R, G and B colors prepared each by dispersing a pigment having respective colors into a thermosetting resin, and then thermosetting the resin portions thus applied to form a colored layer. It is general to form a protective layer on the colored layer in each process.

The need of repeating the same steps three times to form the three colored patterns of R, G and B is common to these processes. Therefore, the production cost is necessarily increased. There is also offered a problem that a yield is reduced as the number of steps increases. Further, in the electrodeposition process, formable patterns are limited. It is hence difficult to apply this process to an active matrix type color liquid crystal display device using TFT (thin layer transistor), what is called TFT type color liquid crystal display device, in the existing technique. Further, the printing process is poor in resolution and is hence unfit for the formation of fine-pitch patterns.

In order to compensate the above-described drawbacks of the conventional production processes, Japanese Patent Application Laid-Open Nos. 59-75205, 63-235901, 1-217302 and 4-123005 each have proposed a process for producing a color filter using an ink-jet system. These processes are different from the above-described conventional processes. In these processes, respective inks of R, G and B colors are applied to prescribed positions on a transparent substrate by an ink-jet head, and the inks thus applied are dried on the substrate to form colored portions. According to these processes, the formation of the individual colored patterns of R, G and B can be performed at once, and moreover the amount of the inks to be used is saved. Therefore, they have effects of enhancing productivity to a great extent and reducing the cost.

The present applicants have previously proposed, as a production process of a color filter using an ink-jet system, a process in which a coloring region is divided into plural scanning regions in order to color the wide coloring region, and the respective scanning regions are successively colored due to moving an ink-jet head, as described in Japanese Patent Application Laid-Open No. 9-138306. In this process, color unevenness has been easy to occur in the vicinity of boundaries between the scanning regions. Therefore, coloring conditions have had to be severely controlled so as not to cause color unevenness. The present applicants have also proposed a process in which scanning for coloring is conducted plural times in the same scanning region, and the position of an ink-jet head is shifted in each scan for coloring, whereby each colored portion is formed with an ink ejected from a plurality of nozzles. The specific coloring process of this proposal will be described by specific examples illustrated in FIGS. 14, 15A to 15C and 16A to 16C. Incidentally, a color filter is generally produced by successively arranging 3 colored portions of R, G and B. For convenience' sake, however, a description is given by illustrating a state that colored portions of the same color have been arranged.

As illustrated in FIG. 14, a coloring region on a substrate 1 on which a color filter will be formed is first divided into a plurality of scanning regions 90*a* to 90*f* according to the length of an ink-jet head 2 having a plurality of nozzles 3. FIGS. 15A to 15C illustrate an example where the scanning regions 90*a* to 90*c* each composed of 6 coloring portions 11 are colored by the ink-jet head 2 having 8 nozzles 13*a* to 13*h*. The ink-jet head 2 is first set in such a manner that the nozzles 13*a* to 13*f* correspond to the respective coloring portions 11 of the scanning region 90*a* located at a left end of the coloring region to intermittently eject ink droplets to the coloring portions 11 from the respective nozzles 13*a* to 13*f* while scanning the ink-jet head 2 in the longitudinal direction of each coloring portion 11 in a state that the ejection of an ink from the nozzles 13*g* and 13*h* has been suspended (FIG. 15A).

The ink-jet head 2 is then shifted by a distance corresponding to one nozzle, and a second scan is conducted in a state that the ejection of the ink from the nozzles 13*a* and 13*h* has been suspended, so as to intermittently eject ink droplets to the coloring portions 11 from the nozzles 13b to 13g (FIG. 15B).

The ink-jet head 2 is further shifted by a distance corresponding to one nozzle, and a third scan is conducted in a state that the ejection of the ink from the nozzles 13a and 13b has been suspended, so as to intermittently eject ink droplets to the coloring portions 11 from the nozzles 13c to 13h (FIG. 15C).

The scanning for coloring the scanning region 90a is completed by the above-described 3 scans. As illustrated in FIGS. 16A to 16C, scanning for coloring is subsequently conducted plural times on the scanning region 90b while shifting the nozzles used one by one in the same manner as in the scanning for coloring in the scanning region 90a. In FIGS. 16A to 16C, reference numerals 107 marked with "⊖" and 108 marked with ⊛ designate ink droplets applied to scanning regions 90a and 90b, respectively. Scanning region 90c in FIGS. 16A to 16C will be colored similarly as above.

In the above-described manner, the ink droplets ejected from the plurality of nozzles are applied to the respective coloring portions, whereby color unevenness due to ejection irregularity among nozzles can be mitigated.

However, when such a process as illustrated in FIGS. 14, 15A to 15C and 16A to 16C is used, stripe-like color unevenness is liable to be observed in the vicinity of boundaries between the adjacent scanning regions, though color unevenness in the same scanning region is mitigated.

As the cause that color unevenness is easy to occur in the vicinity of boundaries between the adjacent scanning regions in the coloring process illustrated in FIGS. 14, 15A to 15C and 16A to 16C, it is considered that colored portions in the vicinity of the boundaries (boundary areas) are different from colored portions in the center of each scanning region in the following points.

(1) There is a great time lag when coloring portions at the boundary areas in the regions different from each other are colored.

(2) Since the positions of nozzles that apply an ink to the coloring portions at the boundary areas are greatly distant from each other in the ink-jet head (nozzles located at both ends), differences in physical quantities such as quantities of ink droplets ejected and impact positions of the ink droplets between such nozzles are liable to be greater than those between adjoining nozzles.

SUMMARY OF THE INVENTION

It is an object of the present invention to provide a production process of a color filter, by which a high-quality color filter free of color unevenness can be produced through simple steps by an ink-jet system, a liquid crystal display device using the color filter produced by this production process, and an ink-jet head used in this production process.

The above object can be achieved by the present invention described below.

According to the present invention, there is thus provided a process for producing a color filter, comprising the steps of dividing a coloring region on a substrate into a plurality of scanning regions and successively coloring the respective scanning regions by an ink-jet system, wherein the scanning regions have a portion overlapped each other.

According to the present invention, there is also provided a liquid crystal display device comprising a color filter substrate produced by the production process described above, an opposite substrate arranged in an opposing relation to the color filter substrate, and a liquid crystal enclosed in a space between both substrates.

According to the present invention, there is further provided an ink-jet head having a plurality of nozzles, wherein a difference in ejected ink quantity between nozzles located at both ends of the ink jet head is 20% or less.

BRIEF DESCRIPTION OF THE DRAWINGS

FIGS. 8A, 8B, 8C, 8D, 8E and 8F schematically illustrate examples of a step of coloring a coloring portion with a plurality of ink droplets.

DESCRIPTION OF THE PREFERRED EMBODIMENTS

A production process of a color filter using an ink-jet system is roughly classified into 2 processes. A first process comprises applying inks to a layer of a resin composition having a high ink absorbency to color the resin composition layer, thereby forming colored portions, and a second process comprises applying inks to aperture regions surrounded by partition members and curing the inks themselves to form colored portions. In each process, mechanisms to cause color unevenness due to a difference in position between nozzles are considered to be as follows.

[First Process]

(a) A scanning region previously scanned for coloring is allowed to stand for a longer time than the next scanning region until a subsequent step (step of drying the inks or curing the resin composition layer), and so the distribution of a colorant varies to affect visual observation.

(b) Components in an ink penetrate from a colored portion in the scanning region previously scanned for coloring to a coloring portion in an adjoining scanning region beyond a boundary between them as the time goes on, thereby exerting an influence on the distribution of the colorant when the coloring portion is colored. As a result, said colored portion differs in the distribution of the colorant from the colored portion in the scanning region previously scanned for coloring to affect visual observation.

(c) A difference in impact position between ink droplets affects the distribution of the colorant in the colored portion to affect visual observation.

[Second Process]

(d) A difference in quantities between inks applied makes a difference in thickness of the colored portion, and hence causes a difference in optical density, thereby affecting visual observation.

(e) A difference in impact positions between ink droplets makes a difference in thickness of the colored portion, and hence causes a difference in optical density, thereby affecting visual observation.

Figure 14:
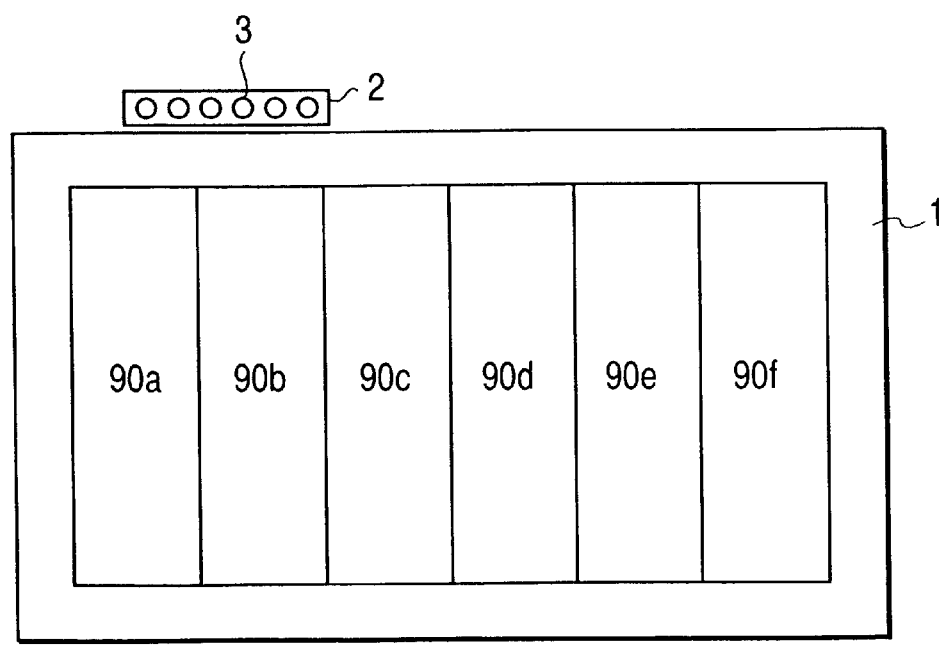
FIG. 14 illustrates coloring regions in the production process previously proposed by the present applicants.
Figure 15A:
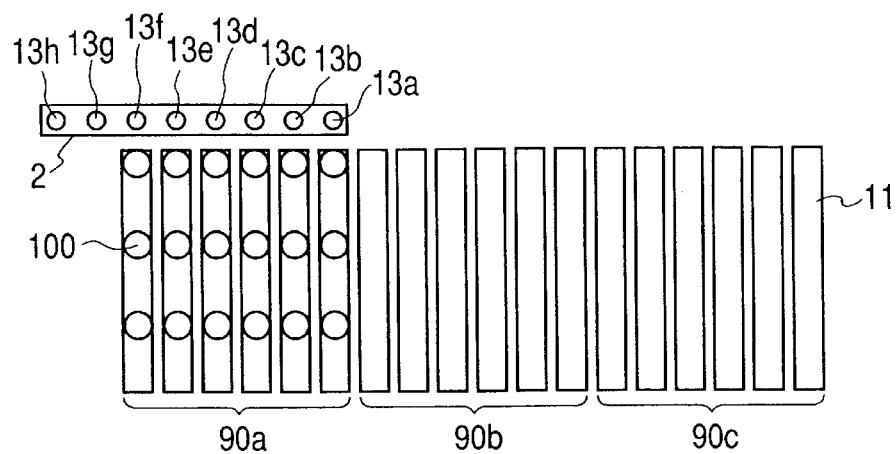
FIGS. 15A, 15B and 15C show a flow chart illustrating a coloring step in the production process previously proposed by the present applicants.
Figure 15B:
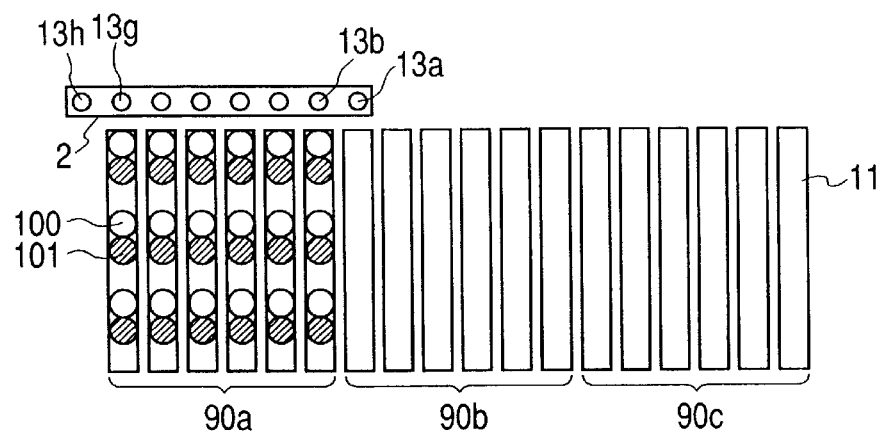
Figure 15C:
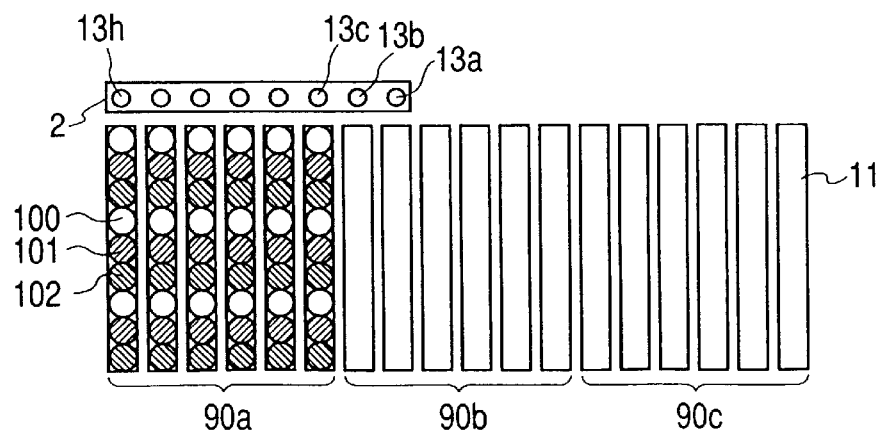
Figure 16A:
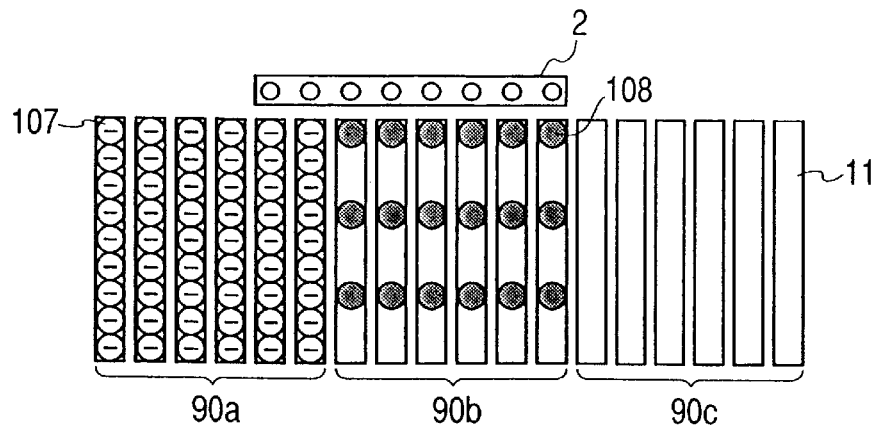
FIGS. 16A, 16B and 16C show a flow chart illustrating a coloring step in the production process previously proposed by the present applicants.
Figure 16B:
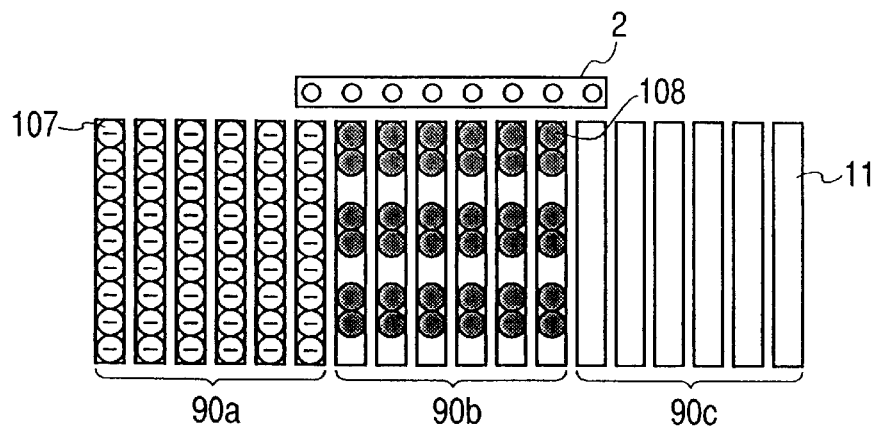
Figure 16C:
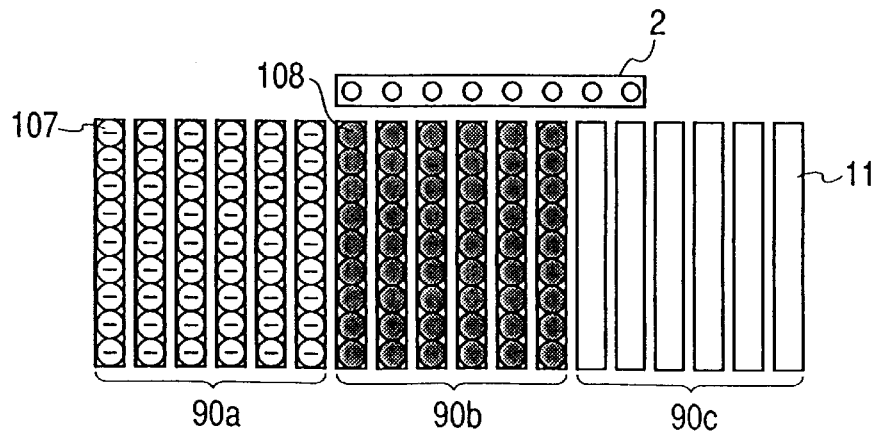

Therefore, the present inventors have found that when coloring portions, to which an ink is applied from nozzles located at both ends of an ink-jet head, are provided so as to overlap an adjoining scanning region without completely dividing a scanning region as illustrated in FIG. 14, the above-described color unevenness at the boundary areas can be mitigated, thus leading to completion of the present invention. The present invention will hereinafter be described specifically.

In the production process of a color filter according to the present invention, ink droplets are applied to a prescribed coloring portion by an ink-jet system to color it. At this time, the ink droplets are applied with their impact positions shifted in the longitudinal direction of the coloring portion. An ink-jet head having a plurality of nozzles is used for each color to eject an ink from different nozzles to one coloring portion, whereby color unevenness between different colored portions due to a difference in ejection quantity among nozzles is prevented. A specific procedure will hereinafter be described. Incidentally, a color filter generally comprises colored portions of colors R, G and B, or including W (white) in addition to these colors. For convenience' sake, however, a description is given below by illustrating a state that colored portions of the same color have been arranged.

Figure 1:
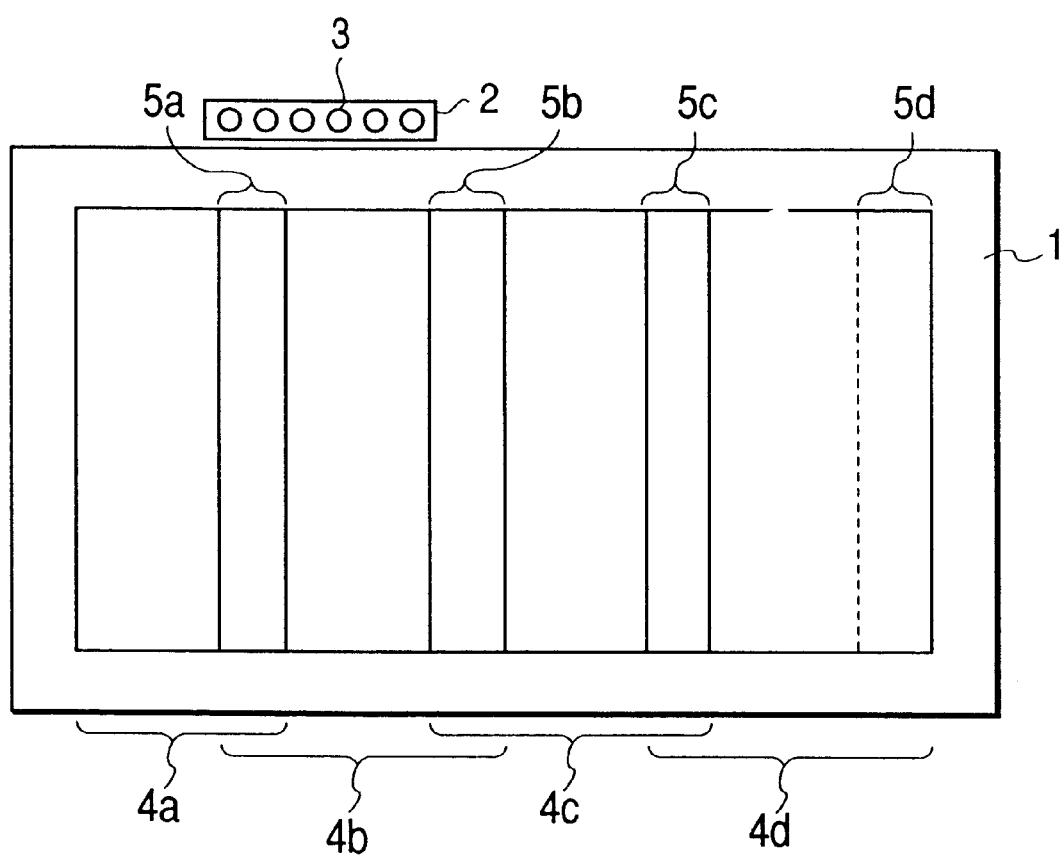
FIG. 1 illustrates coloring regions according to the production process of the present invention.

FIG. 1 illustrates coloring regions in the production process of a color filter of the present invention. In FIG. 1, reference numerals 1 and 2 indicate a substrate and an ink-jet head, respectively. The head 2 is provided with six nozzles 3. In the color filter illustrated in FIG. 1, the coloring region is divided into scanning regions 4a to 4d because the width of the coloring region is wide. The scanning regions 4a to 4d overlap with respective adjacent scanning region(s). The overlapped regions are indicated by 5a to 5c. Reference character 5d designates an imaginary overlapped region with an imaginary scanning region adjoining on the right side of the scanning region 4d in FIG. 1. This region is defined as a region outside a display region because a necessary amount of an ink is not applied, or no imaginary overlapped region is provided to preset the ink-jet head so as to apply no ink by controlling nozzles corresponding to this region. In the scanning region 4a, an imaginary overlapped region located on the left side of the scanning region 4a in FIG. 1 is substantially not provided.

A specific process for applying an ink will now be described by an embodiment with respect to FIGS. 2A to 2C and FIGS. 3A to 3C. In the drawings, reference numerals 11 and 2 indicate a coloring portion and an ink-jet head having eight nozzles 13a to 13h, respectively. In this embodiment, the width of each of scanning region 4b, 4c and so forth corresponds to 10 coloring portions (the scanning region 4a located at a left end in the drawings is narrower by 2 coloring portions because it has no overlapped region on the left side thereof, and its width corresponds to 8 coloring portions). In this embodiment, scanning for coloring is conducted 3 times on each scanning region to apply an ink to each coloring portion from 3 different nozzles.

In FIGS. 2A to 2C, 3A to 3C, 4A to 4E, 5A to 5E, 6A to 6E and 7A to 7E, reference characters 4a to 4c, and 5a and 5b designate scanning regions and overlapped regions, respectively, and reference numerals 2 and 11 indicate the ink-jet head and the coloring portions, respectively.

Figure 2A:
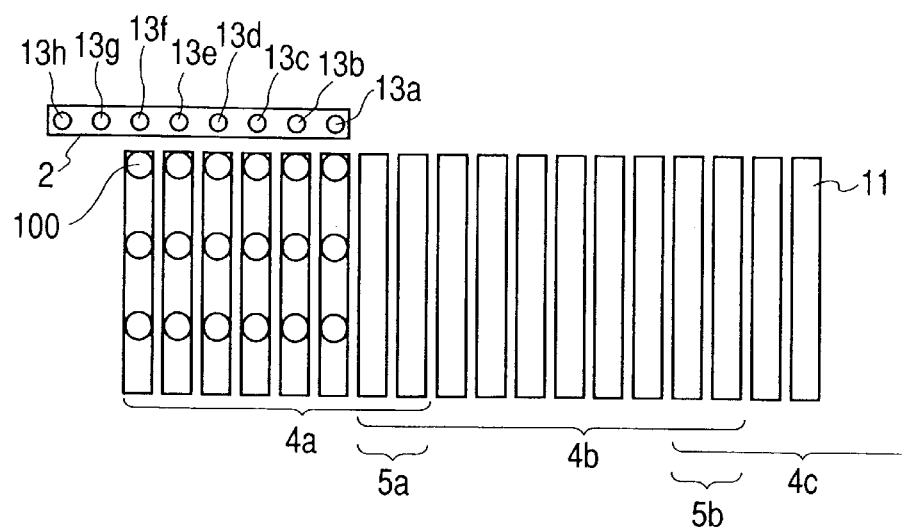
FIGS. 2A, 2B and 2C show a flow chart illustrating a coloring step for coloring a scanning region in the production process of the present invention.

With respect to the scanning region 4a, the ink-jet head 2 is first scanned in the longitudinal direction of each coloring portion 11 to intermittently apply ink droplets from the nozzles 13a to 13f to their corresponding coloring portions 11 with a space of 2 droplets left between ink droplets, while ejection of the ink from the nozzles 13g and 13h is suspended (FIG. 2A).

Figure 2B:
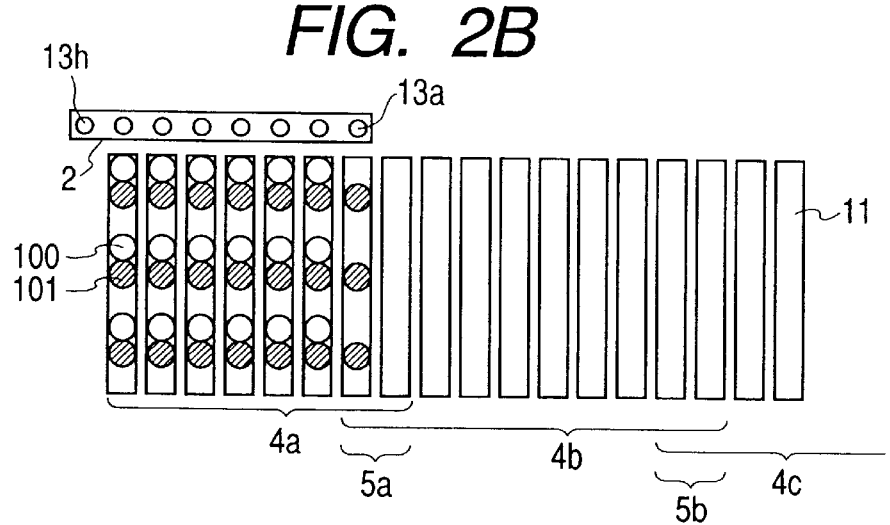

The ink-jet head 2 is then scanned at a position where the ink-jet head 2 has been shifted by a distance corresponding to one nozzle in the longitudinal direction of the head, thereby applying ink droplets again 2 droplets apart from the nozzles 13a to 13g to their corresponding coloring portions 11 at positions respectively shifted by one dot from the ink dot previously applied (FIG. 2B). The ink-jet head 2 is further shifted by a distance corresponding to one nozzle in the longitudinal direction of the head to similarly scan the ink-jet head 2 (FIG. 2C).

Figure 2C:
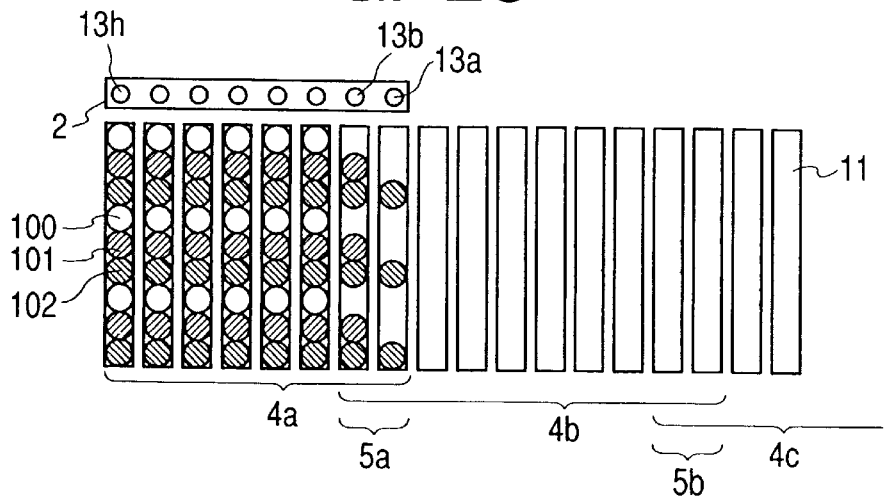

In FIGS. 2A to 2C, reference numerals 100 marked with "○", 101 marked with ◉ and 102 marked with ◉ designate ink droplets at a first scan, a second scan and a third scan, respectively.

Figure 3A:
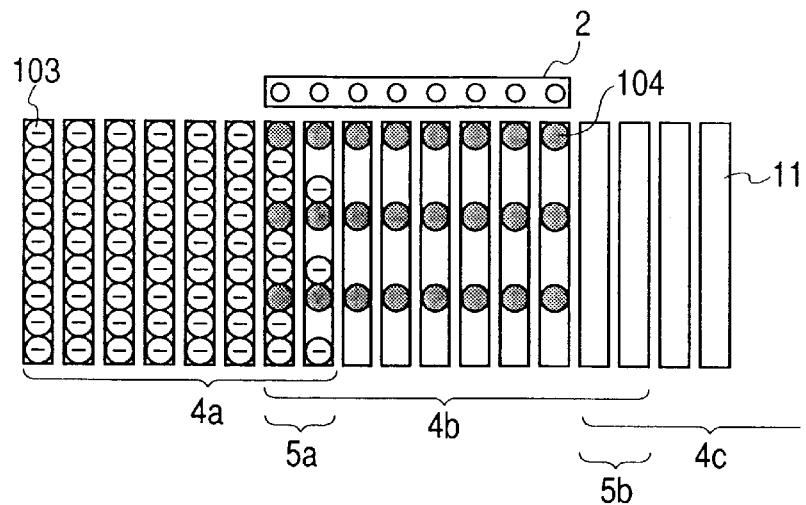
FIGS. 3A, 3B and 3C show a flow chart illustrating a coloring step for coloring another scanning region in the production process of the present invention.

Scanning for coloring the scanning region 4b is then conducted. The ink-jet head 2 is moved in such a manner that the nozzle 13h located at a left end thereof corresponds to a coloring portion 11 located at a left end in the overlapped region 5a as illustrated in FIG. 3A, and ink droplets are ejected 2 droplets apart in one scan in a similar manner to the step illustrated in FIG. 2A. The ink-jet head 2 is shifted every scan by a distance corresponding to one nozzle and scanning is conducted 3 times, thereby coloring this region.

Figure 3B:
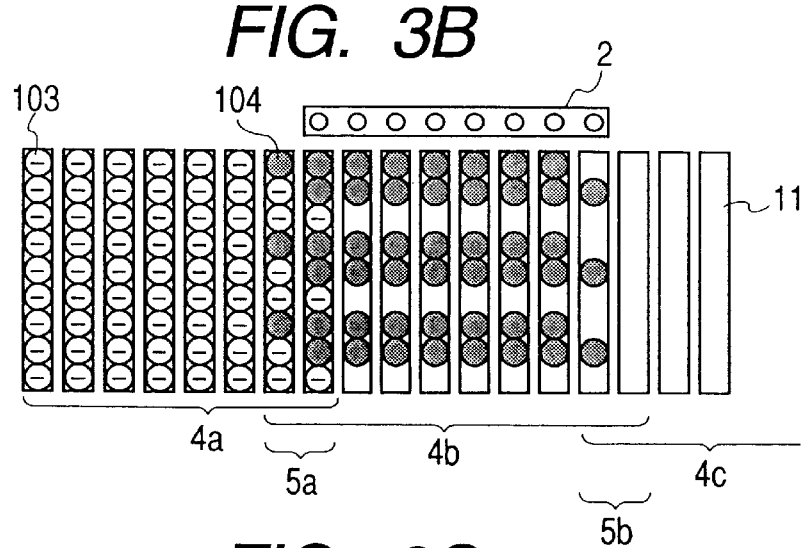
Figure 3C:
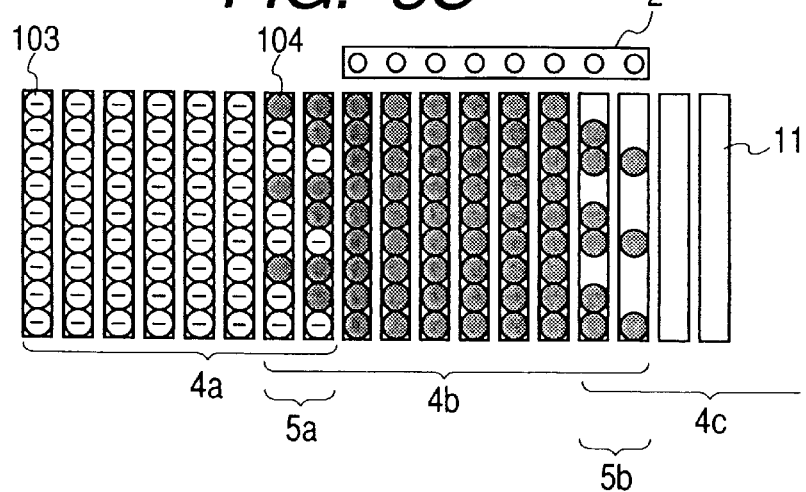

In FIGS. 3A to 3C, reference numerals 103 marked with "⊖" and 104 marked with ◉ designate ink droplets applied to scanning regions 4a and 4b, respectively.

In the above-described embodiment, the ink-jet head 2 has been shifted every scan by a distance corresponding to one nozzle in the longitudinal direction of the head. However, the head may be shifted by a distance corresponding to two nozzles or more to widen the width of the overlapped region. In each scan, ink droplets have been intermittently applied one by one with a space of 2 droplets left between ink droplets. However, 2 ink droplets may be continuously applied with a space of, for example, 4 droplets left between ink droplets. The number of continuous droplets may be suitably preset. The number of nozzles that the ink-jet head has may also be suitably preset. Further, the number of times of scanning may be suitably preset.

Another example of the production process of a color filter according to the present invention is illustrated in FIGS. 4A to 4E and FIGS. 5A to 5E.

In FIGS. 4A to 4E, the ink-jet head 2 has ten nozzles 13a to 13j. In this embodiment, the width of each scanning region corresponds to 14 coloring portions (the scanning region 4a located at a left end in the drawings is narrower by 4 coloring portions because it has no overlapped region on the left side thereof, and its width corresponds to 10 coloring portions). In this embodiment, scanning for coloring is conducted 5 times on each scanning region to apply an ink to each coloring portion from 5 different nozzles.

Figure 4A:
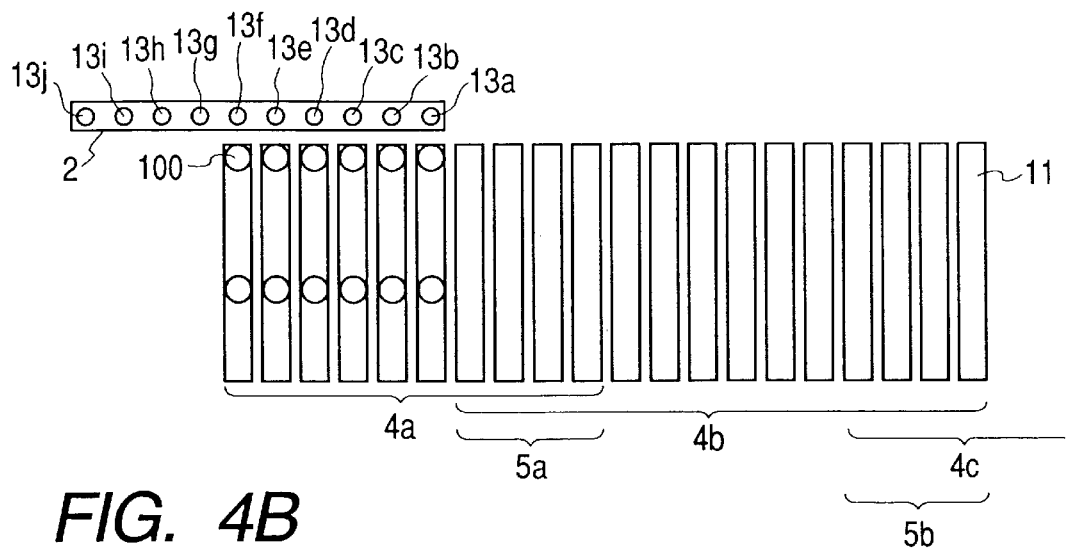
FIGS. 4A, 4B, 4C, 4D and 4E show a flow chart illustrating another example of the coloring step in the production process of the present invention.

With respect to the scanning region 4a, the ink-jet head 2 is first scanned in the longitudinal direction of each coloring portion 11 to intermittently apply ink droplets from the nozzles 13a to 13f to their corresponding coloring portions 11 with a space of 4 droplets left between ink droplets, while ejection of the ink from the nozzles 13g to 13j is suspended (FIG. 4A).

Figure 4B:
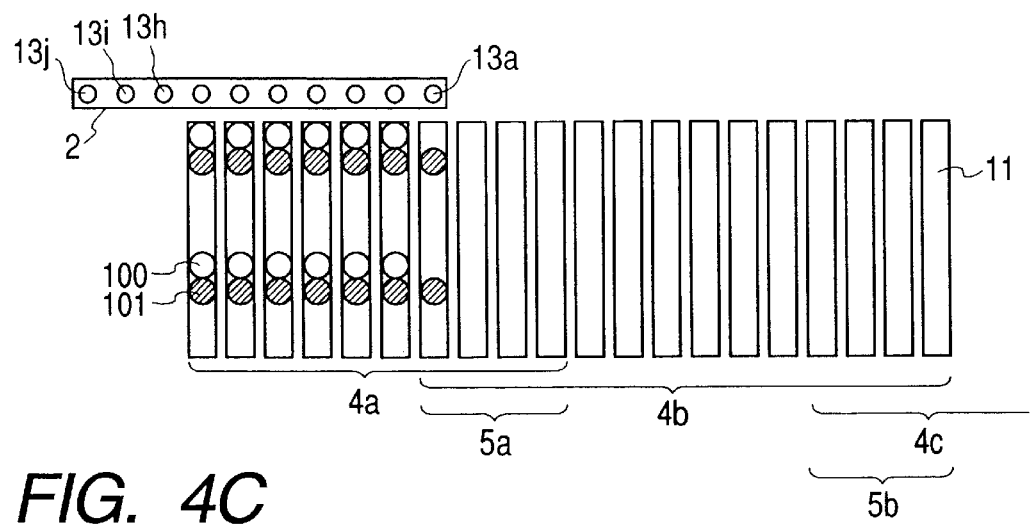
Figure 4C:
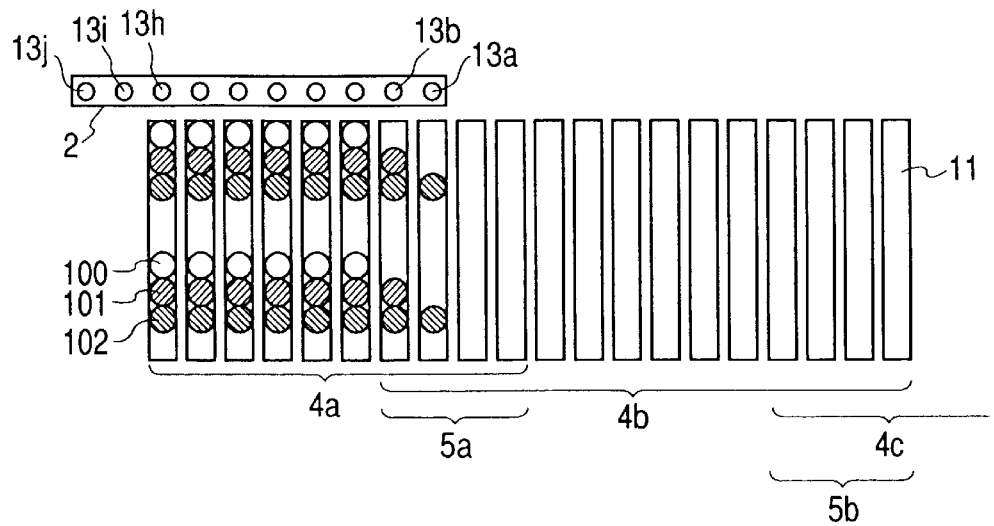

The ink-jet head 2 is then scanned at a position where the ink-jet head 2 has been shifted by a distance corresponding to one nozzle in the longitudinal direction of the head, thereby applying ink droplets again 4 droplets apart from the nozzles 13a to 13g to their corresponding coloring portions 11 at positions respectively shifted by one dot from the ink dot previously applied (FIG. 4B). The ink-jet head 2 is further shifted by a distance corresponding to one nozzle in the longitudinal direction of the head to similarly scan the ink-jet head 2 (FIG. 4C). This operation is repeated further twice (FIGS. 4D and 4E).

Figure 4D:
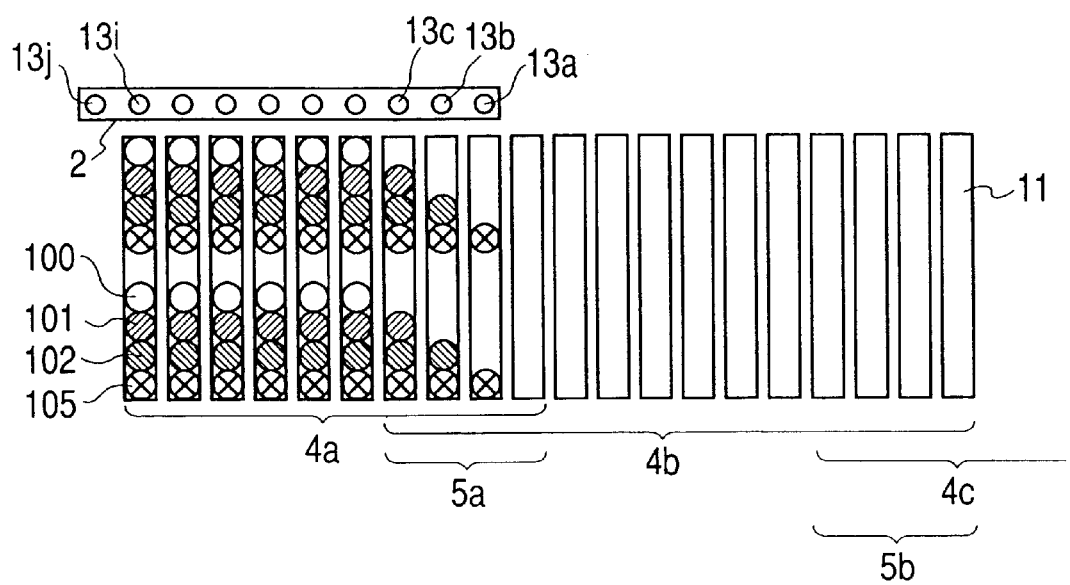
Figure 4E:
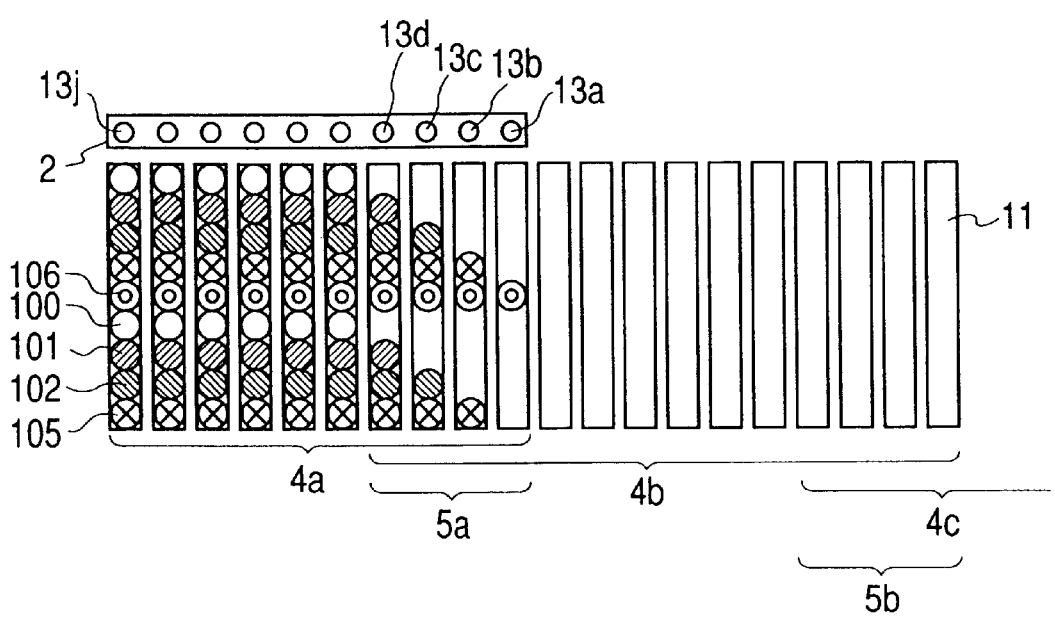

In FIGS. 4D and 4E, reference numerals 105 marked with "⊗" and 106 marked with "⊙" designate ink droplets at a fourth scan and a fifth scan, respectively.

Figure 5A:
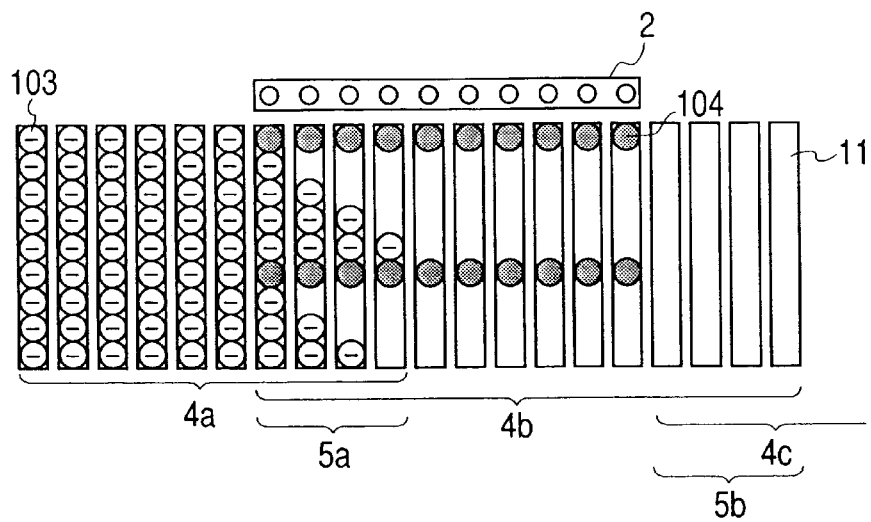
FIGS. 5A, 5B, 5C, 5D and 5E show a flow chart illustrating a further example of the coloring step in the production process of the present invention.
Figure 5B:
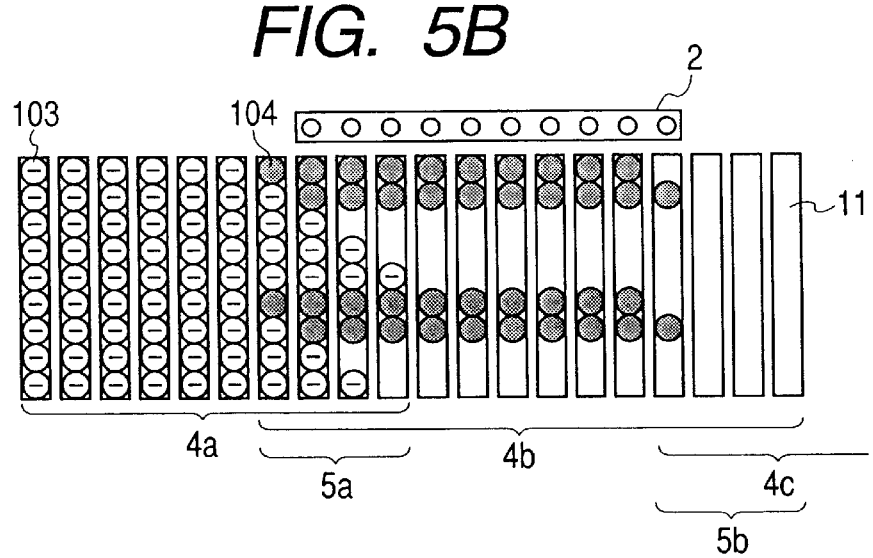
Figure 5C:
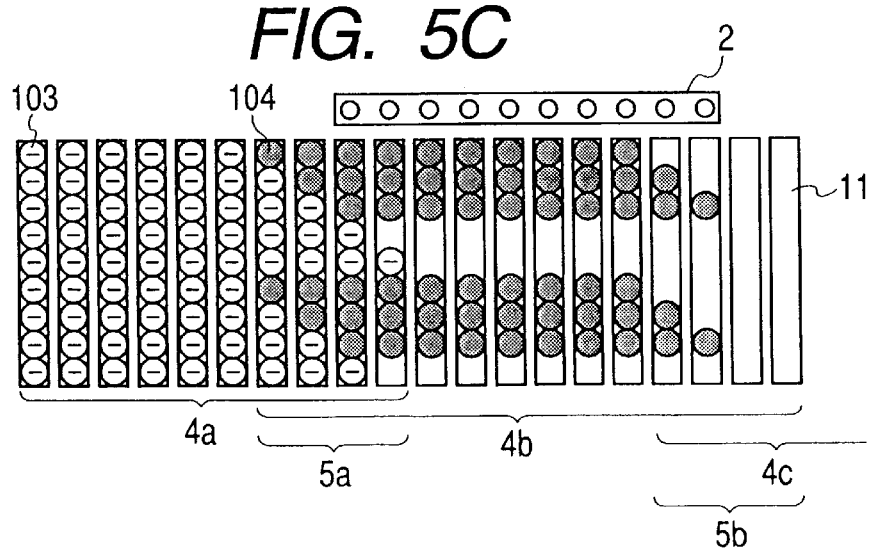
Figure 5D:
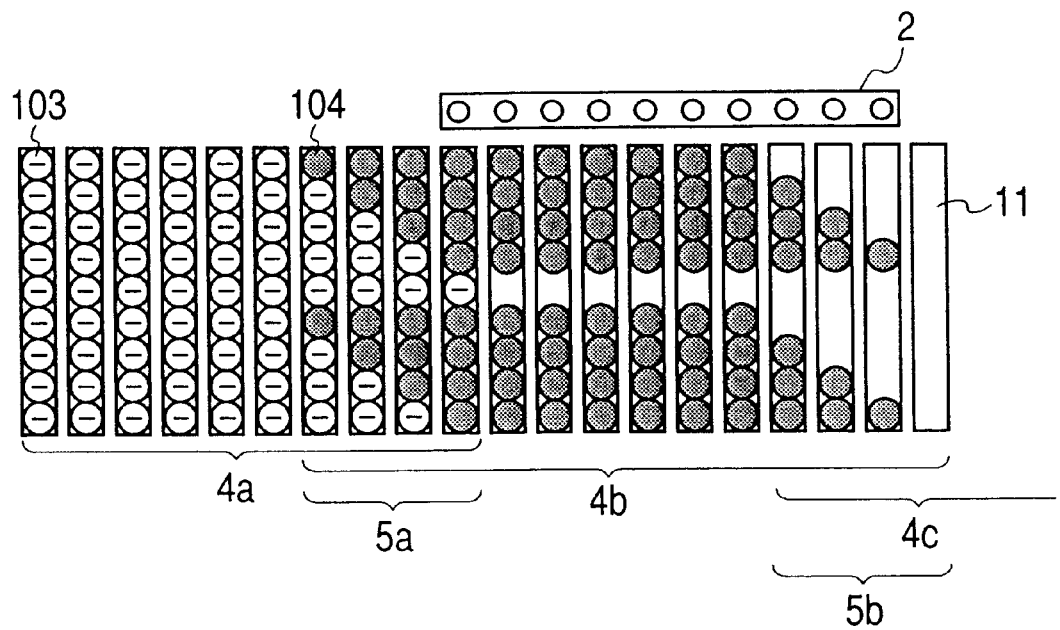
Figure 5E:
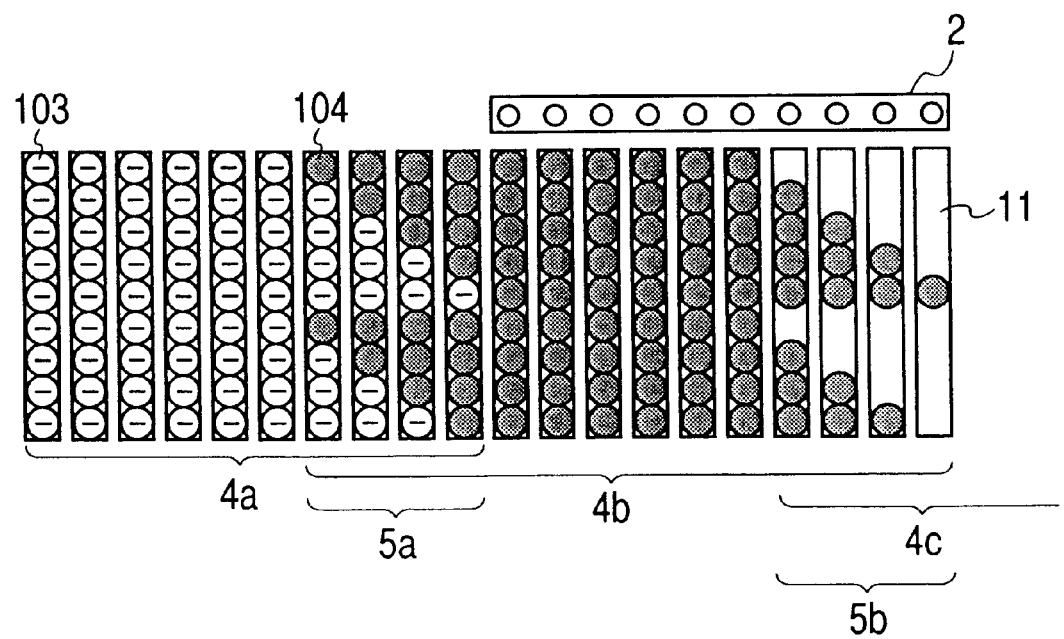

Scanning for coloring the scanning region 4b is then conducted. The ink-jet head 2 is moved in such a manner that the nozzle 13j located at a left end of the head corresponds to a coloring portion located at a left end in the overlapped region 5a as illustrated in FIG. 5A, and ink droplets are ejected 4 droplets apart in one scan in a similar manner to the step illustrated in FIG. 4A. The ink-jet head 2 is shifted every scan by a distance corresponding to one nozzle to conduct scanning 5 times, thereby coloring this region (FIGS. 5A to 5E).

All the scanning regions are colored in the above-described manner.

A further example of the production process of a color filter according to the present invention is illustrated in FIGS. 6A to 6E and FIGS. 7A to 7E.

In FIGS. 6A to 6E, the ink-jet head 2 has ten nozzles 13a to 13j. In this embodiment, the width of each scanning region corresponds to 14 coloring portions (the scanning region 4a located at a left end in the drawings is narrower by 4 coloring portions because it has no overlapped region on the left side thereof, and its width corresponds to 10 coloring portions). In this embodiment, scanning for coloring is conducted 5 times on each scanning region to apply an ink to each coloring portion from 5 different nozzles.

Figure 6A:
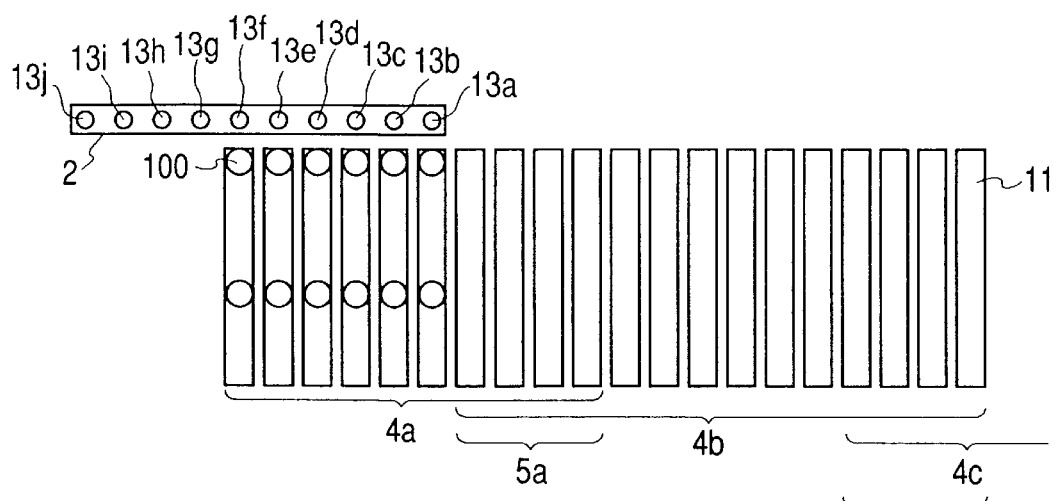
FIGS. 6A, 6B, 6C, 6D and 6E show a flow chart illustrating a still further example of the coloring step in the production process of the present invention.

With respect to the scanning region 4a, the ink-jet head 2 is first scanned in the longitudinal direction of each coloring portion 11 to intermittently apply ink droplets from the nozzles 13a to 13f to their corresponding coloring portions 11 with a space of 4 droplets left between ink droplets, while ejection of the ink from the nozzles 13g to 13j is suspended (FIG. 6A).

Figure 6B:
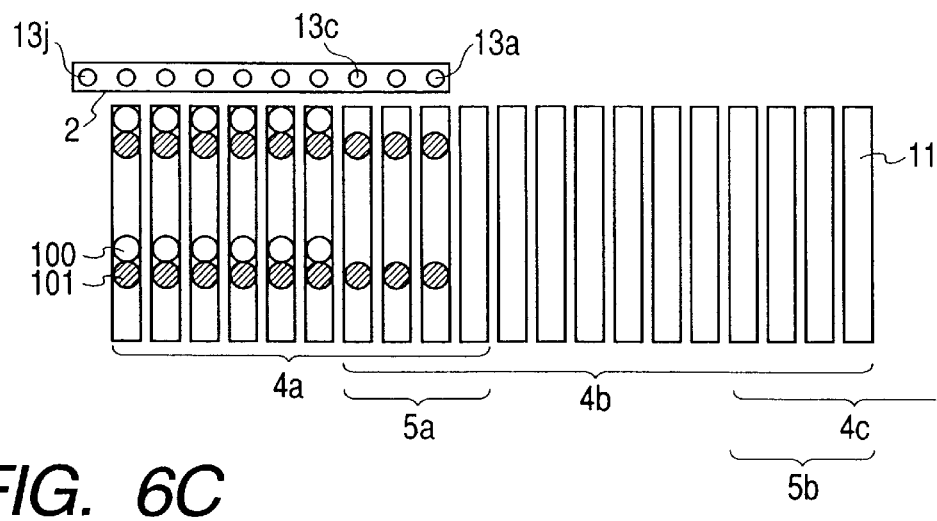
Figure 6C:
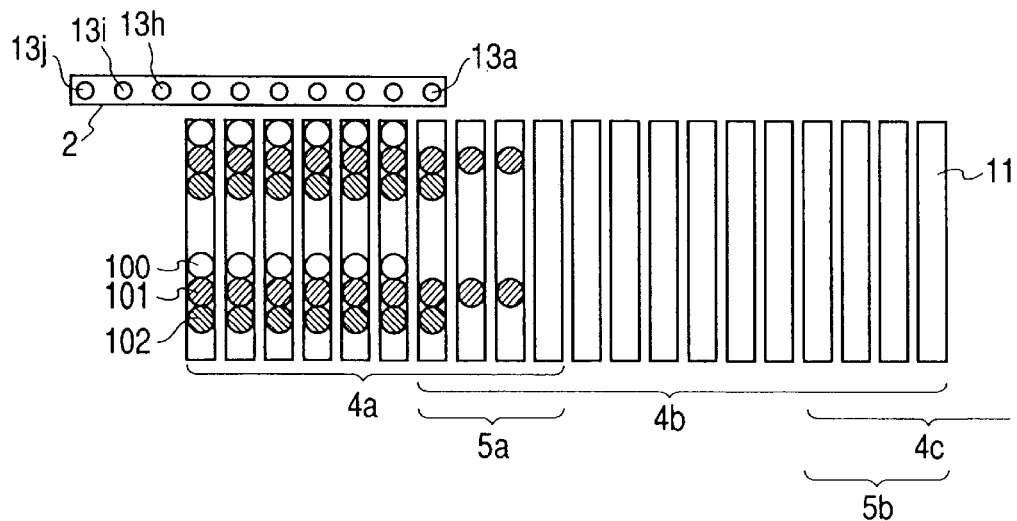
Figure 6D:
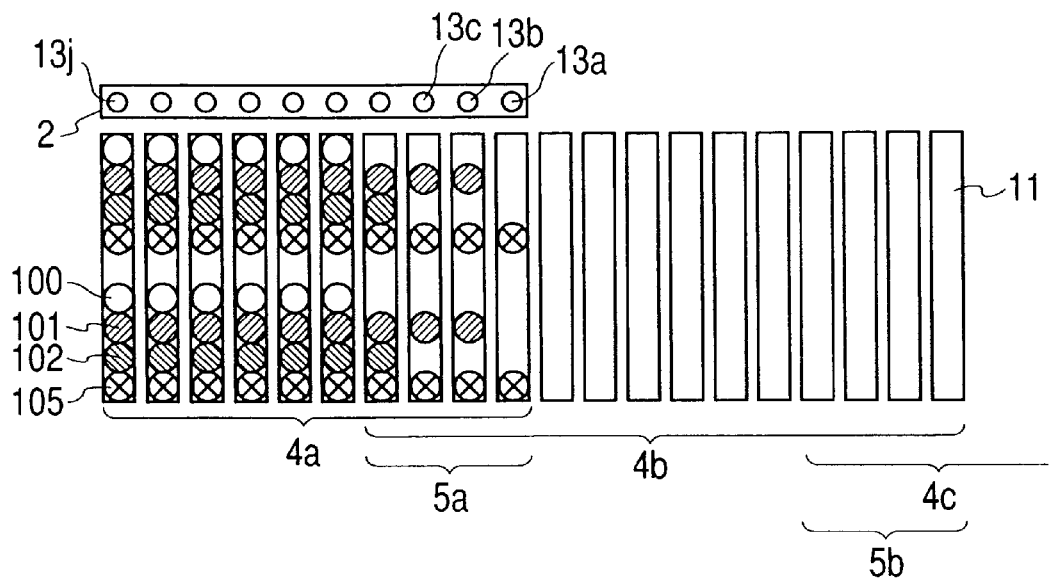
Figure 6E:
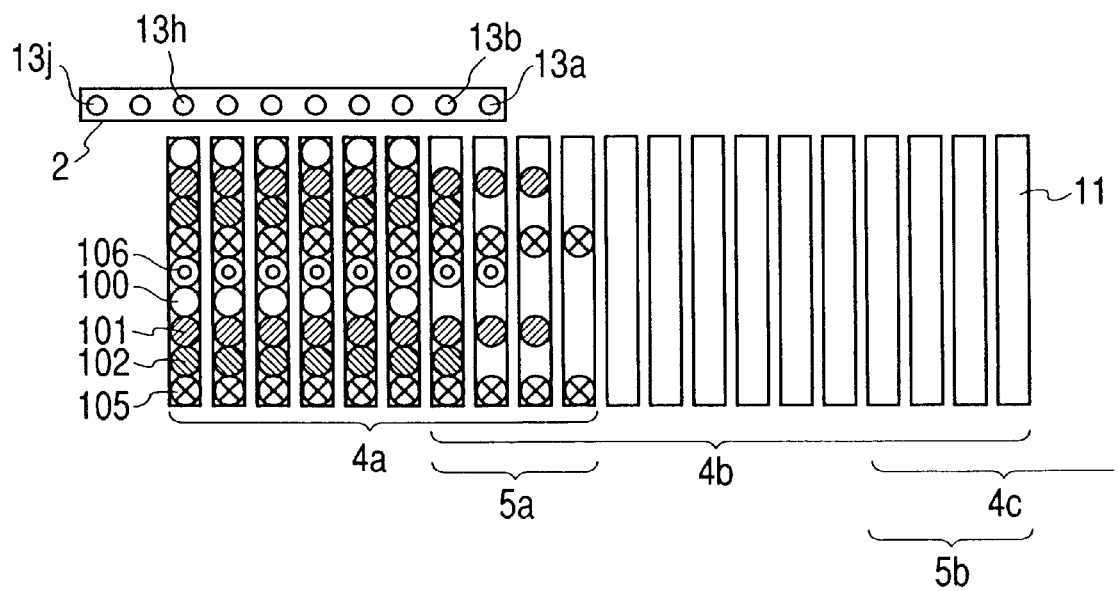

The ink-jet head 2 is then scanned at a position where the ink-jet head 2 has been shifted by a distance corresponding to 3 nozzles in the longitudinal direction of the head, thereby applying ink droplets again 4 droplets apart from the nozzles 13a to 13i to their corresponding coloring portions 11 at positions respectively shifted by one dot from the ink dot previously applied (FIG. 6B). The ink-jet head 2 is then returned by a distance corresponding to 2 nozzles in the longitudinal direction of the head to similarly scan the ink-jet head 2 (FIG. 6C). The ink-jet head 2 is further shifted by a distance corresponding to 3 nozzles in the longitudinal direction of the head to similarly scan the ink-jet head 2 (FIG. 6D). The ink-jet head 2 is finally returned by a distance corresponding to 2 nozzles in the longitudinal direction of the head to similarly scan the ink-jet head 2 (FIG. 6E).

Figure 7A:
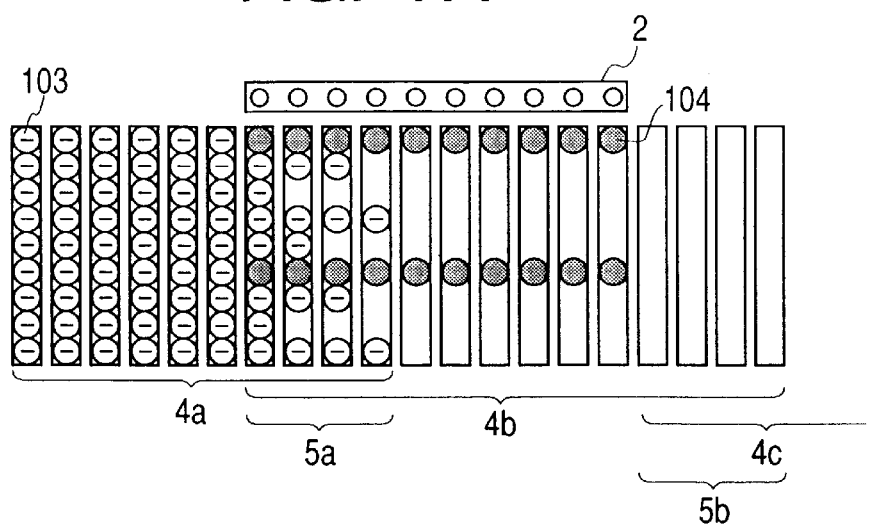
FIGS. 7A, 7B, 7C, 7D and 7E show a flow chart illustrating a yet still further example of the coloring step in the production process of the present invention.
Figure 7B:
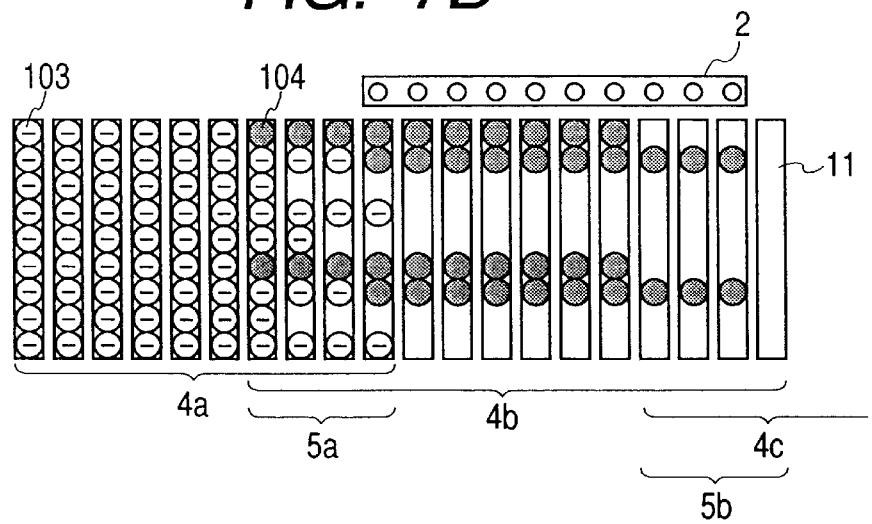
Figure 7C:
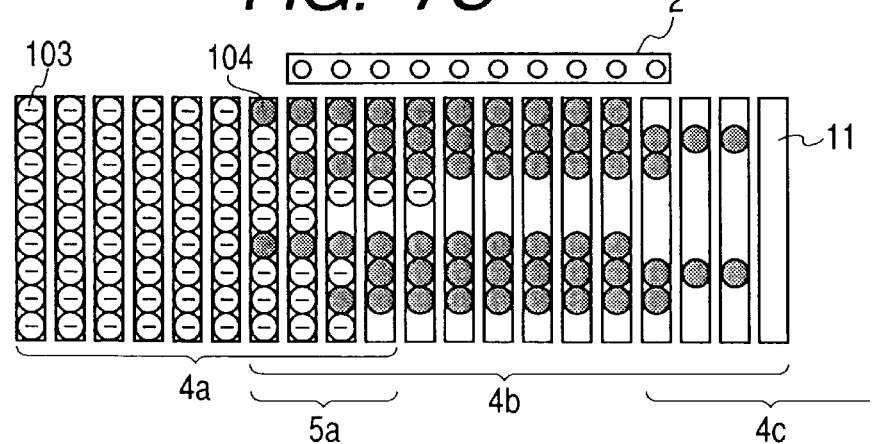
Figure 7D:
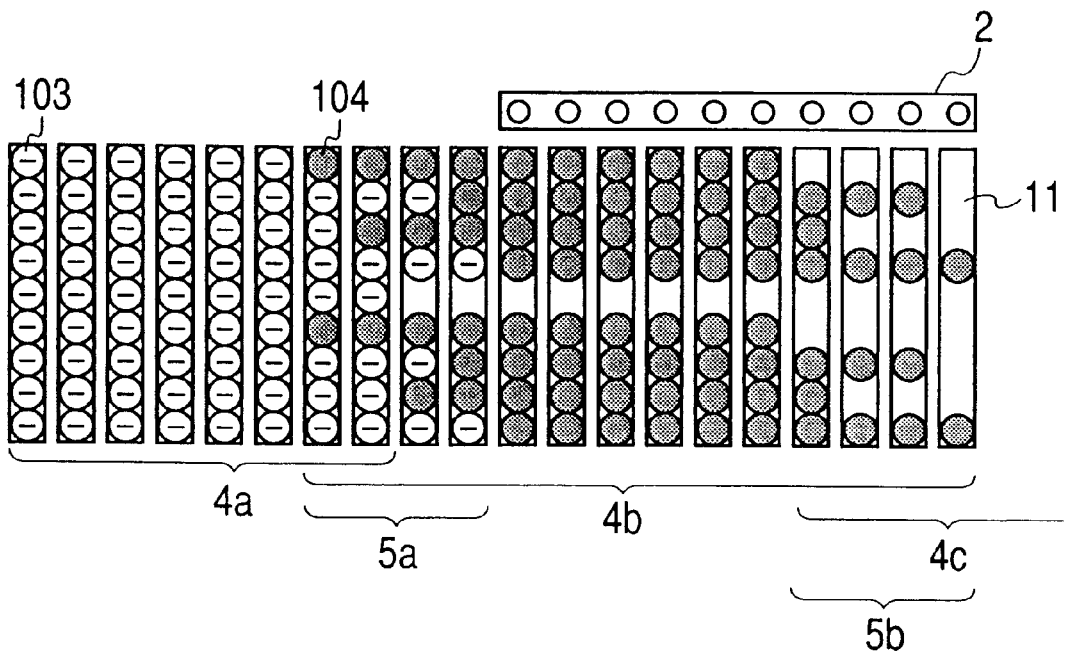
Figure 7E:
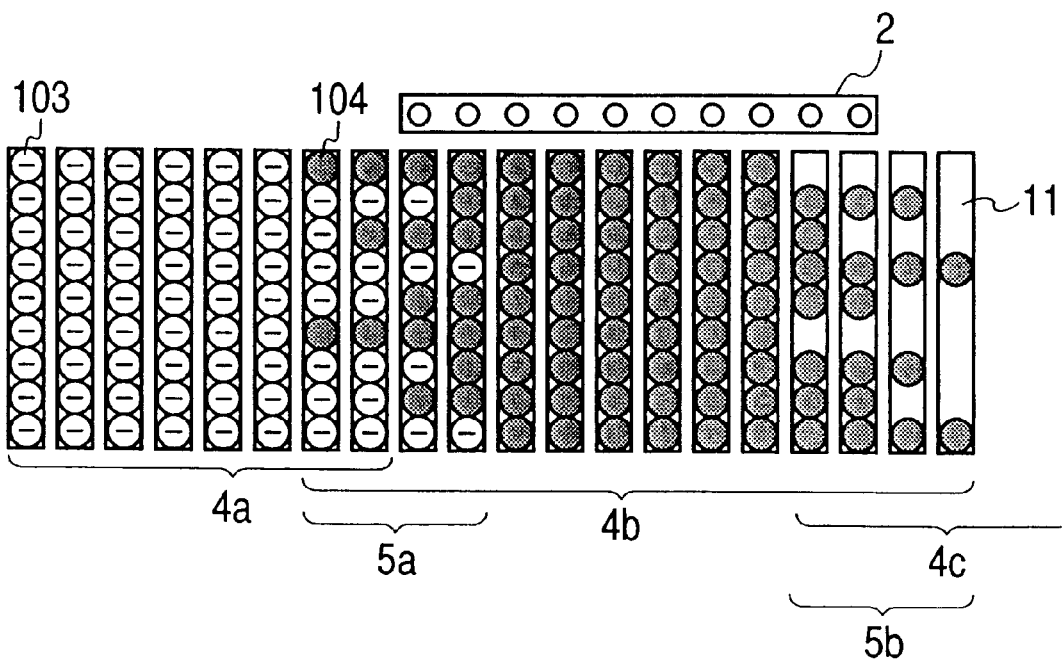
Figure 9A:
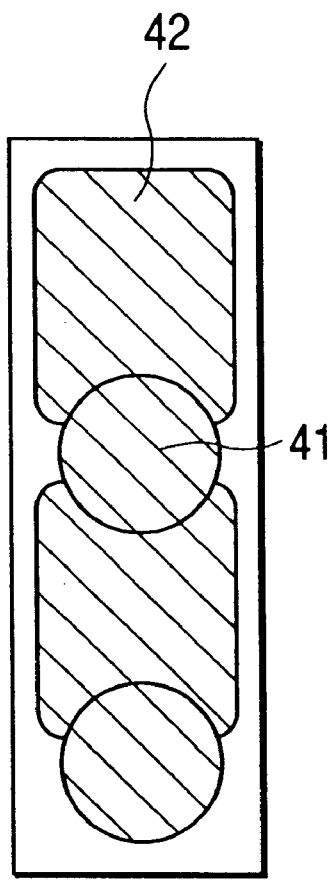
FIGS. 9A and 9B schematically illustrate another example of a step of coloring a coloring portion with a plurality of ink droplets.
Figure 9B:
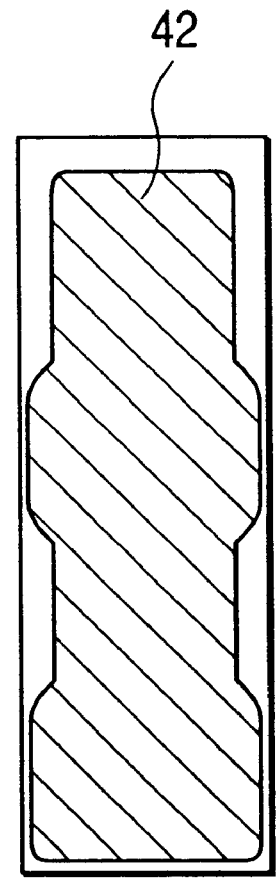

Scanning for coloring the scanning region 4b is then conducted. The ink-jet head 2 is moved in such a manner that the nozzle 13j located at a left end of the head corresponds to a coloring portion located at a left end in the overlapped region 5a as illustrated in FIG. 7A, and ink droplets are ejected 4 droplets apart in one scan in a similar manner to the step illustrated in FIG. 6A. The ink-jet head 2 is shifted or returned every scan to conduct scanning 5 times, thereby coloring this region (FIGS. 7A to 7E).

All the scanning regions are colored in the above-described manner.

In FIGS. 4A to 4E, 6A to 6E and 15A to 15C, reference numerals 100, 101 and 102 have the same meaning as those in FIGS. 2A to 2C, and In FIGS. 5A to 5E, 7A to 7E and 16A to 16C, reference numerals 103 and 104 have the same meaning as those in FIGS. 3A to 3C.

As described above, an ink is applied from different nozzles to one coloring portion, whereby color unevenness between different colored portions due to a difference in ejection quantity among nozzles can be mitigated. At the same time, an overlapped portion is provided between adjacent scanning regions, and an ink is applied to the coloring portions in the overlapped region from nozzles located at both ends of the ink-jet head, whereby such differences in nozzles distant from each other as described above can be offset, thereby preventing color unevenness at boundary areas between adjacent scanning regions.

In the process illustrated in FIGS. 15A to 15C and 16A to 16C, the ejection of the ink from the nozzles out of the scanning region is suspended, while in the production process according to the present invention, the ink can be ejected from all the nozzles, and so the width of a region colorable by one scan can be substantially widen ed to shorten the time required for coloring.

In the process illustrated in FIGS. 15A to 15C and 16A to 16C, the nozzles located at both ends of the ink-jet head, from which the ejection of the ink is intermittently suspended, greatly differ in frequency of use from the other nozzles. As a result, the quantity of the ink ejected tends to change with time. In the present invention, however, there is little difference in frequency of use among the nozzles used. Therefore, their changes with time are also equal with one another, so that any detrimental influence is hard to be exerted thereby.

In the above description, the production process according to the present invention has been described by illustrating the constructions that colored portions of the same color are continuously arranged. However, a color filter is generally fabricated by successively arranging colored portions of R, G and B, or including W in addition to these colors, in the form of stripes or dots. Accordingly, in an actual coloring process, it is necessary to constitute ink-jet heads and nozzles thereof according to the prescribed coloring pattern to conduct scanning. In the above description, the embodiments in which the ink-jet head is scanned have been described. However, the ink-jet head may be fixed and a transparent substrate is scanned to the ink-jet head in some cases. Therefore, the present invention may also include this embodiment.

The whole process of the production process of a color filter according to the present invention will now be described. As described above, the production process of the present invention includes the first process which comprises applying inks to a layer of a resin composition having a high ink absorbency to color the resin composition layer, thereby forming colored portions, and a second process which comprises applying inks to aperture regions surrounded by partition members and curing the inks themselves to form colored portions. Preferred embodiments of the respective processes will hereinafter be described.

[First Process]

As the first process, more specifically, preferred is a process comprising the steps of forming a layer of a resin composition, the ink absorbency of which is enhanced or lowered by light irradiation or light irradiation and heat treatment, on a transparent substrate, subjecting a prescribed region of the resin composition layer to light irradiation or light irradiation and heat treatment to form coloring portions having a high ink absorbency and non-coloring portions having a lower ink absorbency than the coloring portions, applying inks to the coloring portions by an ink-jet system to color the coloring portions, thereby forming colored portions, and subjecting the whole resin composition layer to light irradiation or light irradiation and heat treatment to cure the resin composition layer. An embodiment of this process will be described with reference to FIGS. 10A to 10F.

FIGS. 10A to 10F show a flow chart illustrating a case where a resin composition, the ink absorbency of which is lowered (or lost) by light irradiation or light irradiation and heat treatment, is used. The respective steps thereof will hereinafter be described. Incidentally, FIGS. 10A to 10F correspond to the following Steps (a) through (f), respectively.

Step (a)

A black matrix 62 is formed on a substrate 61. A glass substrate is generally used as the substrate 61. However, the substrate is not limited to the glass substrate so far as it has properties required of a color filter, such as transparency and mechanical strength.

Figure 10A:
FIGS. 10A, 10B, 10C, 10D, 10E and 10F show a flow chart illustrating an example of the production process of the present invention.
Figure 10B:
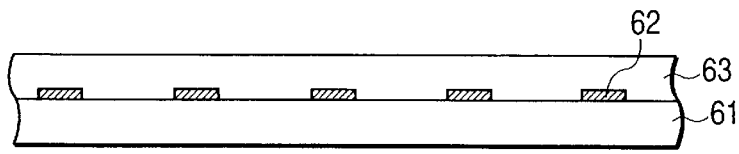
Figure 10C:
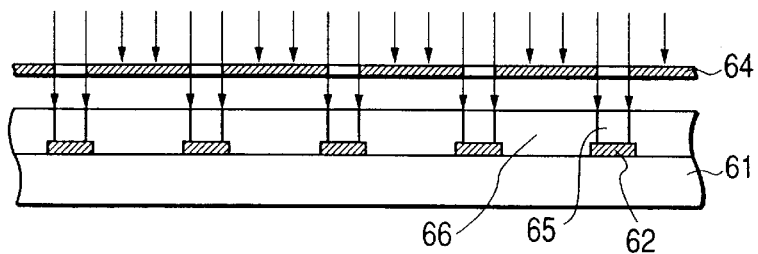
Figure 10D:
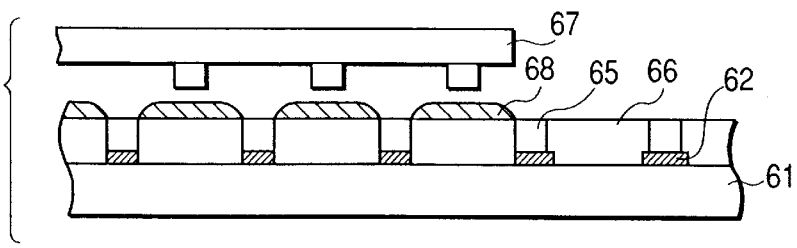
Figure 10E:
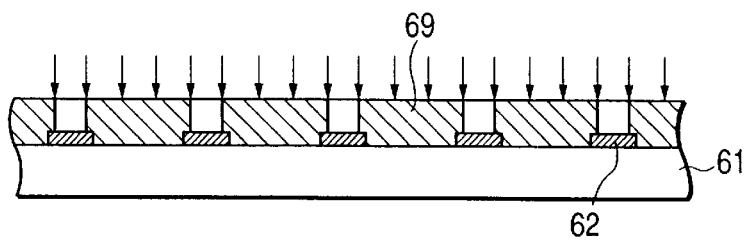
Figure 10F:
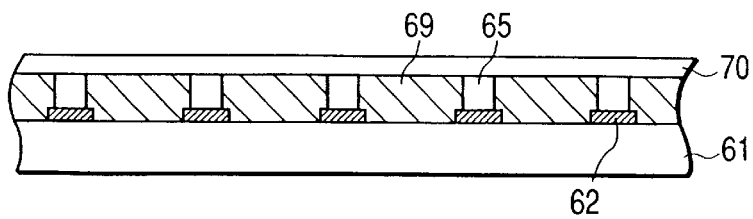

No particular problem is imposed on a case where after a resin composition layer 63 as in FIG. 10B, which will be described subsequently, is formed, or the resin composition layer 63 is colored, the black matrix is form on the resin composition layer. As a method for forming the black matrix, a process comprising the steps of forming a thin metal film by sputtering or vapor deposition, and patterning this film by a photolithographic process is general. However, the method is not limited thereto.

Step (b)

A resin composition, which is cured by light irradiation or light irradiation and heat treatment to lower its ink absorbency at light-exposed portions thereof, is applied to the substrate 61 and prebaked as needed, thereby forming the resin composition layer 63 as an ink-receiving layer.

As a base resin of such a resin composition, is used a resin such as an acrylic, epoxy or amide type. However, the base resin is not particularly limited thereto. A photo-initiator (crosslinking agent) may be used in such a resin for facilitating a crosslinking reaction by light or a combination of light and heat. As the photo-initiator, may be used a dichromate, bisazide compound, radical initiator, cationic initiator, anionic initiator or the like. These photo-initiators may be used as a mixture thereof, or in combination with another sensitizer. Further, a photo-induced acid generator such as an onium salt may be used in combination with the crosslinking agent. Incidentally, a heat treatment may be conducted after the light irradiation for the purpose of more facilitating the crosslinking reaction.

The resin composition layer 63 can be formed by using a coating process such as spin coating, roll coating, bar coating, spray coating or dip coating. However, the coating process is not particularly limited thereto.

Step (c)

Regions of the resin composition layer, which are screened from light by elements of the black matrix 62, are subjected to patterning exposure by means of a photomask 64 to cure those portions, thereby lowing the ink absorbency thereof to form the non-coloring portions 65. The regions subjected to no exposure have a high ink absorbency and serve as coloring portions 66. Since the non-coloring portions 65 having a low ink absorbency intervene between adjacent coloring portions 66, color mixing between adjacent colored portions can be prevented. As the photomask 64 used in this step, there is used a photomask having openings for exposing the resin composition layer at portions corresponding to the areas to be screened from light by the elements of the black matrix 62. In view of the need of applying an ink in a rather great amount to prevent color skip at a portion coming into contact with the black matrix 62, at this time, it is preferable to use a mask having openings narrower than the light-screening width of the black matrix.

Step (d)

Inks 68 of R, G and B colors are applied to the coloring portions 66 according to the prescribed coloring pattern by means of an ink-jet head 67. At this time, an ink-jet head having plural nozzles is used for each color as described above, and an ink is applied from a plurality of different nozzles to each coloring portion 66 to color it.

As the inks used in the coloring, both dye inks and pigment inks may be used. Both liquid inks and solid inks may also be used. When water-based inks are used, it is preferred to form the resin composition layer 63 with a resin composition having a high water absorbency. The inks are not limited to inks which are liquid at ordinary temperature. Even inks solidified at room temperature or lower may preferably be used so far as they soften or are liquid at room temperature, or turn liquefied at the time the inks will be ejected, since in an ordinary ink-jet system, an ink itself is kept under temperature control within a range of from 30° C. to 70° C. to control the viscosity of the ink within a stable range.

As the ink-jet system, a bubble-jet type using an electro-thermal converter as an energy-generating element, a piezo-jet type making use of a piezoelectric element, or the like may be used. A coloring area and a coloring pattern may be optionally preset.

In the present invention, a difference in ejected ink quantity between nozzles from which an ink is applied to the coloring portions in the above-described overlapped region in this step is controlled to 20% or less, whereby color unevenness can be further mitigated. The action thereof will be described with reference to FIGS. 8A to 8F and 9A to 9B. In order to clarify the action of this constitution, the description is given by illustrating a case where no non-coloring portion is formed in FIGS. 8A to 8F and 9A to 9B.

As illustrated in FIG. 8A, ink droplets 41 are applied to a coloring portion with their impact positions shifted in the longitudinal direction of the coloring portion. The ink applied gradually spreads and penetrates into the resin composition layer to form a colored portion 42 uniformly colored as illustrated in FIG. 8B.

Since ink droplets are continuously applied to any coloring portion outside the overlapped region, the droplets are rapidly joined together and uniformly spread to color the coloring portion as illustrated in FIG. 8B. However, in the overlapped region, it takes a longer time from the time an ink has been applied to a coloring portion in the overlapped region by scanning for coloring in the preceding scanning region until the time an ink is applied to the coloring portion in the overlapped region by scanning for coloring in the next scanning region. Therefore, the ink applied by the scanning for coloring in the preceding scanning region spreads and dries once as illustrated from FIG. 8C to FIG. 8D. When the quantity of each ink droplet applied by the scanning for coloring in the next scanning region is equal to that by the preceding scanning for coloring, the droplet can uniformly spread as illustrated in FIG. 8B. When ink droplet 41 is applied too small (FIG. 8E), however, the droplet cannot fully spread (FIG. 8F), so that unevenness occurs in the colored portions 42 between the scanning regions other than the overlapped regions and the overlapped regions when viewed as the whole color filter, and is recognized as gentle unevenness. Even when the quantity of each ink droplet 41 applied by the next scanning for coloring is too great on the other hand, the droplet spreads too widely as illustrated from FIG. 9A to FIG. 9B, so that unevenness occurs in the colored portions 42 between the scanning regions other than the overlapped regions and the overlapped regions when viewed as the whole color filter, and is recognized as gentle unevenness.

In the case shown in FIG. 8E, at the portions of the ink droplets applied later, the colored portion tends to cause blank areas or lower its optical density to cause color unevenness. In the case shown in FIG. 9A, at the portions of the ink droplets applied later, the colored portion tends to increase its optical density to cause color unevenness.

The present inventors have found that the unevenness due to the difference in the quantity of ink droplets in the overlapped region can substantially be prevented by controlling the difference in the quantity of ink droplets to 20% or less. More specifically, a difference in ejected ink quantity between nozzles from which an ink is applied to the overlapped region in this step is controlled to 20% or less, whereby the effect can be achieved. Namely, an ink-jet head, wherein a difference in ejected ink quantity between nozzles located at both ends thereof is 20% or less, is used, whereby color unevenness can be further mitigated.

Step (e)

After the inks are dried as needed, the whole surface of the substrate is exposed to light to cure the colored portions 69. A heat treatment may be conducted in place of the light irradiation (exposure).

Step (f)

A protective layer 70 is formed as needed. As the protective layer 70, may be used a resin layer capable of curing by light, heat or a combination of light and heat, or an inorganic film formed by vapor deposition or sputtering. However, any layer or film may be used so far as it has sufficient transparency to be used in a color filter and withstands subsequent ITO-forming process, alignment film-forming process and the like.

When a resin composition of the type that the ink absorbency thereof is enhanced (or developed) by light irradiation or light irradiation and heat treatment is used, this resin composition is preferably of a system making good use of a reaction by chemical amplification. Examples of a base resin in such a system include products obtained by esterifying hydroxyl groups of cellulose derivatives such as hydroxypropyl cellulose and hydroxyethyl cellulose, or blocking them with an acetyl group or the like (for example, compounds of the cellulose acetate type); products obtained by esterifying hydroxyl groups of polymeric alcohols such as polyvinyl alcohol, and derivatives thereof, or blocking them with an acetyl group or the like (for example, compounds of the polyvinyl acetate type); and products obtained by blocking hydroxyl groups of novolak resin such as cresol novolak, and poly(p-hydroxystyrene) and derivatives thereof with, for example, a trimethyl-silyl group. However, the present invention is not limited to these compounds.

In order to make a substantial difference in an ink absorbency by exposure in the present invention, it is generally preferred that the conversion of a functional group convertible into a hydrophilic group into the hydrophilic group be at least 30%. As a method for determining the hydrophilic group in this case, spectral analyses such as IR and NMR are effective.

As the photo-initiator, an onium salt such as triphenyl-sulfonium hexafluoroantimonate, halogenated organic compound such as trichloromethyltriazine, or naphthoquinone diazide or a derivative thereof is preferably used. However, the photo-initiators are not limited to these so far as the resin composition is composed of a composition the ink absorbency of which is enhanced by light irradiation or light irradiation and heat treatment at the light-exposed portions.

When such a resin composition is used, the black matrix formed on the transparent substrate may also be used as a mask to conduct exposure from the back side of the transparent substrate, thereby exposing the resin composition layer at other portions than areas screened from light by the black matrix.

[Second Process]

FIGS. 12A to 12D show a flow chart illustrating the second process. Like reference numerals are given to the same members as in FIGS. 10A to 10F, and their descriptions are omitted. FIGS. 12A to 12D correspond to the following Steps (a) to (d), respectively.

Step (a)

Partition members are first formed on a substrate 61. The partition members are members for preventing color mixing between adjacent inks of different colors upon the application of inks, which will be described subsequently. In this embodiment, the partition members are formed as black matrix 82 combined with a light-screening layer. The black matrix 82 is formed by patterning according to a general photolithographic process using, preferably, a black pigment-containing resist. Ink repellency is preferably imparted to the black matrix 82 in advance for preventing the color mixing between adjacent inks of different colors upon the application of inks, which will be described subsequently. The thickness of the black matrix 82 in the present invention is preferably at least 0.5 μm in view of the action of preventing color mixing as the partition members and light-screening action. Portions corresponding to apertures formed in the black matrix 82 will become coloring portions in the present invention.

Step (b)

Respective inks 83 of R, G and B colors are applied to the substrate by means of an ink-jet head 67 according to a prescribed coloring pattern so as to fill up the apertures formed in the black matrix 82. As this time, an ink-jet head having a plurality of nozzles is used for each color as described above, and an ink is applied from a plurality of different nozzles to the aperture.

The inks used in the present invention comprise each preferably a resin composition which can be cured by applying energy thereto and contains a colorant. As the colorants, general dyes and pigments may be used. Examples of usable dyes include anthraquinone dyes, azo dyes, triphenylmethane dyes and polymethine dyes.

As the resin cured by applying energy, is preferred a resin cured by, for example, heat treatment or light irradiation. Specifically, as a thermosetting resin, a combination of any known resin and a crosslinking agent may be used. Examples thereof include an acrylic resin, a melamine resin, a hydroxyl group or carboxyl group-containing polymer and melamine; a hydroxyl group or carboxyl group-containing polymer and a polyfunctional epoxy compound; a hydroxyl group or carboxyl group-containing polymer and a reactive cellulose compound; an epoxy resin and a resol resin; an epoxy resin and an amine; an epoxy resin and a carboxylic acid or an acid anhydride, or epoxy compounds. As a photosetting resin, any known photosetting resin, for example, a commercially available negative resist may preferably be used.

Various kinds of solvents may be used in the above-described inks. A mixed solvent of water and at least one water-soluble organic solvent is particularly preferably used from the viewpoint of ejectability in the case where the inks are used in the ink-jet system.

Further, the inks may contain, in addition to the above-described components, surfactants, antifoaming agents, antiseptics and the like as needed to provide them as inks having desired properties. Commercially-available water-soluble dyes and/or the like may also be added thereto.

Of the above-described photo- or thermosetting resins, those insoluble in water or water-soluble organic solvents may also be used with any other solvent than water and water-soluble organic solvents so far as the resulting ink can be stably ejected. In the case where a monomer of the type that polymerization is induced by light in particular is used, a dye is dissolved in the monomer to prepare an ink of the solvent-free type.

Step (c)

The inks 83 applied to the portions corresponding to the apertures formed in the black matrix 82 are cured by heat treatment or light irradiation or a combination thereof, thereby forming colored portions 84.

Step (d)

A protective layer 70 is formed as needed.

Figure 11:
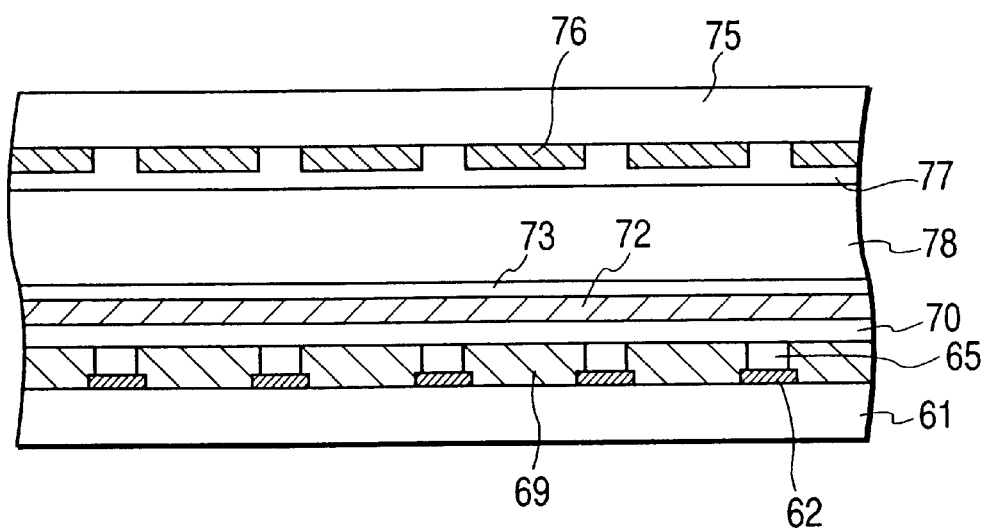
FIG. 11 is a cross-sectional view illustrating an example of a liquid crystal display device according to the present invention.
Figure 12A:
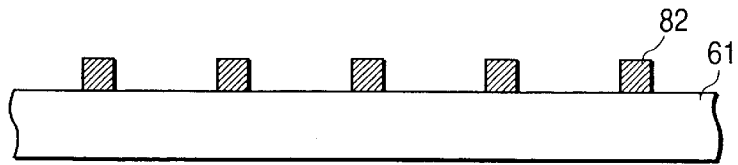
FIGS. 12A, 12B, 12C and 12D show a flow chart illustrating another example of the production process of the present invention.
Figure 12B:
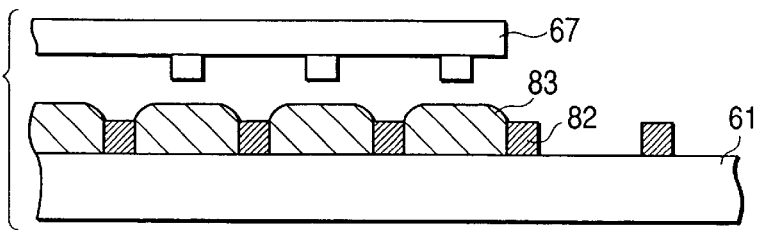
Figure 12C:
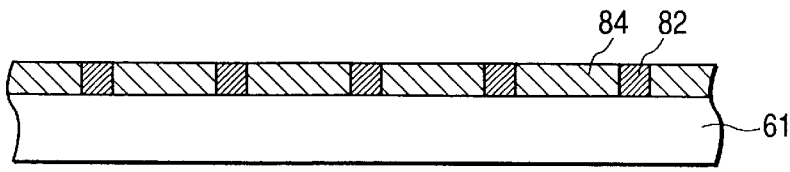
Figure 12D:
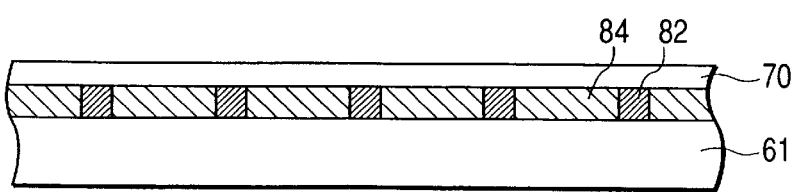
Figure 13:
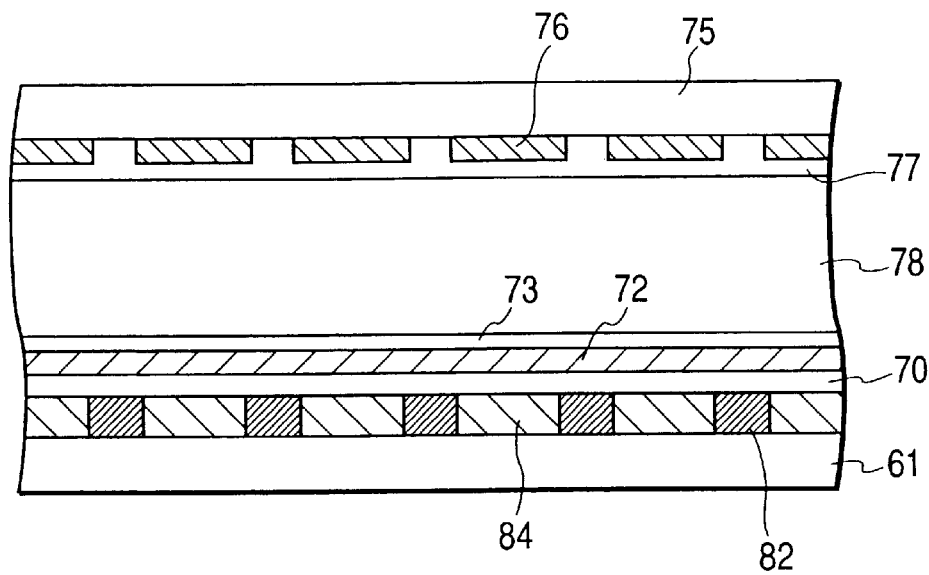
FIG. 13 is a cross-sectional view illustrating another example of a liquid crystal display device according to the present invention.

Liquid crystal display devices fabricated by using the color filter according to the present invention will now be described by embodiments illustrated in FIGS. 11 and 13. FIG. 11 and FIG. 13 are schematic cross-sectional views of active matrix type liquid crystal display devices according to the embodiments of the present invention, in which the color filters produced by the processes illustrated in FIGS. 10A to 10F, and FIGS. 12A to 12D have been incorporated, respectively. In FIGS. 11 and 13, reference numeral 72 designates a common electrode, 73 is an alignment film, 75 is a substrate, 76 is pixel electrodes, 77 is an alignment film, and 78 is a liquid crystal compound. Like reference numerals are given to the same members as in FIGS. 10A to 10F and 12A to 12D.

The color liquid crystal display devices are generally formed by uniting the color filter substrate 61 and the TFT substrate 75 opposite to the color filter substrate and enclosing the liquid crystal compound 78 in a space between both substrates. On the inside of one substrate 75 of each liquid crystal display device, TFT (not illustrated) and the transparent pixel electrodes 76 are formed in the form of a matrix. On the inside of the other substrate 61, a color filter layer is provided in such a manner that colored portions 69 or 84 of R, G and B colors are arranged at positions opposite to the pixel electrodes 76. The transparent common electrode 72 is formed over the whole surface of the color filter layer. Black matrix 62 or 82 is generally formed on the side of the color filter substrate, but may be formed on the side of the TFT substrate in a liquid crystal display device of the BM on array type. The alignment films 73 and 77 are further formed on the respective insides of both substrates. Liquid crystal molecules can be aligned or oriented in a fixed direction by subjecting these films to a rubbing treatment.

Polarizing plates (not illustrated) are bonded to the outer surfaces of the respective substrates. The liquid crystal compound is caused to function as an optical shutter for changing the transmittance of light from a back light generally composed of a combination of a fluorescent lamp and a scattering plate (both, not illustrated), thereby making a display.

In the liquid crystal display devices according to the present invention, with respect to other members than the color filter, the conventional techniques for liquid crystal display device, for example, materials and production processes thereof, may be applied thereto so far as the devices are fabricated by using the color filter according to the present invention.

According to the present invention, as described above, color unevenness in each scanning region upon coloring a display region by dividing it into a plurality of scanning regions can be prevented, and at the same time, color unevenness between adjacent scanning regions can also be prevented, so that high-quality color filters free of any color unevenness in the whole display region can be provided by a simple process more shortened with good yield, and liquid crystal display devices having excellent color display properties can be provided by using such a color filter at a low cost.

What is claimed is:

1. A process for producing a color filter by dividing a coloring region on a substrate into a plurality of scanning regions and successively coloring the respective scanning regions by an ink-jet system, comprising the steps of:

performing a first coloring operation for a first scanning region in the plurality of scanning regions by repeating a main scanning operation of moving an ink-jet head relative to the substrate a plurality of times in a predetermined direction and a subscanning operation of moving the ink-jet head relative to the substrate a plurality of times in a direction perpendicular to the predetermined direction by a relatively small first distance;

performing a subscanning operation of moving the ink-jet head relative to the substrate once in the direction perpendicular to the predetermined direction by a relatively large second distance;

performing a second coloring operation for a second scanning region in the plurality of scanning regions by repeating a main scanning operation of moving the ink-jet head relative to the substrate a plurality of times in the predetermined direction and a subscanning operation of moving the ink-jet head relative to the substrate a plurality of times in the direction perpendicular to the predetermined direction by the first distance, wherein the second distance in the subscanning operation step is such that the first scanning region and the second scanning region overlap each other, and the overlapped region is colored by the first coloring operation in the first coloring operation step and the second coloring operation in the second coloring operation step.

2. The process for producing a color filter according to claim 1, wherein the coloring in the scanning regions is conducted by a coloration of coloring portions in each scanning region.

3. The process for producing a color filter according to claim 2, wherein the coloring of one coloring portion is conducted using different nozzles of an ink-jet head.

4. The process for producing a color filter according to claim 3, wherein the different nozzles are used by shifting the ink-jet head in the longitudinal direction of the ink jet head.

5. The process for producing a color filter according to claim 1, wherein an ink-receiving layer is provided on the substrate and the ink-receiving layer is colored.

6. The process for producing a color filter according to claim 5, wherein a difference is caused in an ink absorbency of the ink-receiving layer and a portion having a relatively high ink absorbency is colored.

7. The process for producing a color filter according to claim 1, further comprising the steps of:

providing partition members on the substrate and coloring aperture regions that are surrounded by the partition members.

8. The process for producing a color filter according to claim 1, wherein an ink-jet head, in which a difference in ejected ink quantity between nozzles located at both ends of the ink jet head is 20% or less, is used to conduct the coloring.

* * * * *